(12) United States Patent
Jendersie

(10) Patent No.: US 11,741,633 B2
(45) Date of Patent: Aug. 29, 2023

(54) CONVERTING DISCRETE LIGHT ATTENUATION INTO SPECTRAL DATA FOR RENDERING OBJECT VOLUMES

(71) Applicant: NVIDIA Corporation, Santa Clara, CA (US)

(72) Inventor: Johannes Jendersie, Berlin (DE)

(73) Assignee: Nvidia Corporation, Santa Clara, CA (US)

( * ) Notice: Subject to any disclaimer, the term of this patent is extended or adjusted under 35 U.S.C. 154(b) by 261 days.

(21) Appl. No.: 17/302,974

(22) Filed: May 17, 2021

(65) Prior Publication Data
US 2022/0375130 A1 Nov. 24, 2022

(51) Int. Cl.
*G06T 7/90* (2017.01)
*G06T 7/55* (2017.01)

(52) U.S. Cl.
CPC .............. *G06T 7/90* (2017.01); *G06T 7/55* (2017.01); *G06T 2207/10024* (2013.01)

(58) Field of Classification Search
CPC ... G06T 7/90; G06T 7/55; G06T 2207/10024; G06T 15/50
USPC ........................................................ 382/162
See application file for complete search history.

(56) References Cited

U.S. PATENT DOCUMENTS

| | | | |
|---|---|---|---|
| 2008/0097173 A1* | 4/2008 | Soyemi | A61B 5/14551 600/310 |
| 2011/0184683 A1* | 7/2011 | Soller | G01N 21/3577 702/85 |
| 2017/0011899 A1* | 1/2017 | Moulds | H01J 49/0036 |
| 2017/0205342 A1* | 7/2017 | Krishnan | G01J 3/36 |
| 2018/0164214 A1* | 6/2018 | Rottenberg | B01L 3/502715 |
| 2022/0247962 A1* | 8/2022 | Maruyama | G01N 15/1429 |

OTHER PUBLICATIONS

Jakob, Wenzel et al., "A Low-Dimensional Function Space for Efficient Spectral Upsampling", EUROGRAPHICS 2019 / P. Alliez and F. Pellacini (Guest Editors) vol. 38 (2019), No. 2, 9 pages.
Jung, A. et al., "Wide Gamut Spectral Upsampling with Fluorescence", Eurographics Symposium on Rendering 2019, T. Boubekeur and P. Sen (Guest Editors), Volue 38 (2019, No. 4, 10 pages.
Otsu, H. et al., "Reproducing Spectral Reflectances from Tristimulus Colors", submitted to Computer Graphics Forum (Apr. 2018), vol. xx (200y), No. z, pp. 1-11.
Macadam, David L., "Maximum Visual Efficiency to Colored Materials", J.O.S.A., Nov. 1935, vol. 25, pp. 361-367.

* cited by examiner

Primary Examiner — Ali Bayat
(74) Attorney, Agent, or Firm — Lowenstein Sandler LLP

(57) ABSTRACT

Disclosed are apparatuses, systems, and techniques to render images depicting light interacting with media that have volume attenuation, using optimized spectral rendering that emulates rendering of the media in tristimulus color rendering schemes.

20 Claims, 13 Drawing Sheets

CONVERTING DISCRETE LIGHT ATTENUATION INTO SPECTRAL DATA FOR RENDERING OBJECT VOLUMES

TECHNICAL FIELD

At least one embodiment pertains to computational technologies used to perform and facilitate graphics applications. For example, at least one embodiment pertains to operations utilized in rendering realistic images of complex scenery that involve transmission and reflection of light interacting with absorbing and scattering media.

BACKGROUND

Image rendering (image synthesis) is a process of generating images from scene data, which can involve various two-dimensional and/or three-dimensional models. The scene data can include positions and geometry (shape, size, orientation) of various objects of the scene, locations of sources of light, information about intensity, type, and color of light produced by the sources, and information about reflectivity/absorptivity of objects. Rendering can then determine how each object of the scene should appear to a viewer looking at the scene from a particular vantage point. A successful rendering algorithm often involves laws of physics, physiological science of color perception, mathematical and statistical modeling, and the like, in addition to complex software development and efficient utilization of processing hardware. Rendering can be static and/or dynamic. In the latter case, at least some of the objects and/or the vantage point of the viewing can be moving, so that at least some of the rendering is performed in real time.

BRIEF DESCRIPTION OF DRAWINGS

FIG. 3A depicts an example piecewise-constant function of the wavelength of light. FIG. 3B depicts an example continuous function of the wavelength of light;

FIG. 4A illustrates an example evaluation scheme to evaluate accuracy of rendering of light interaction with a volume medium using an optimized attenuation function, in accordance with at least some embodiments. FIG. 4B illustrates attenuation function optimization using primary colors of a target space, in accordance with at least some embodiments.

DETAILED DESCRIPTION

Figure 1A:
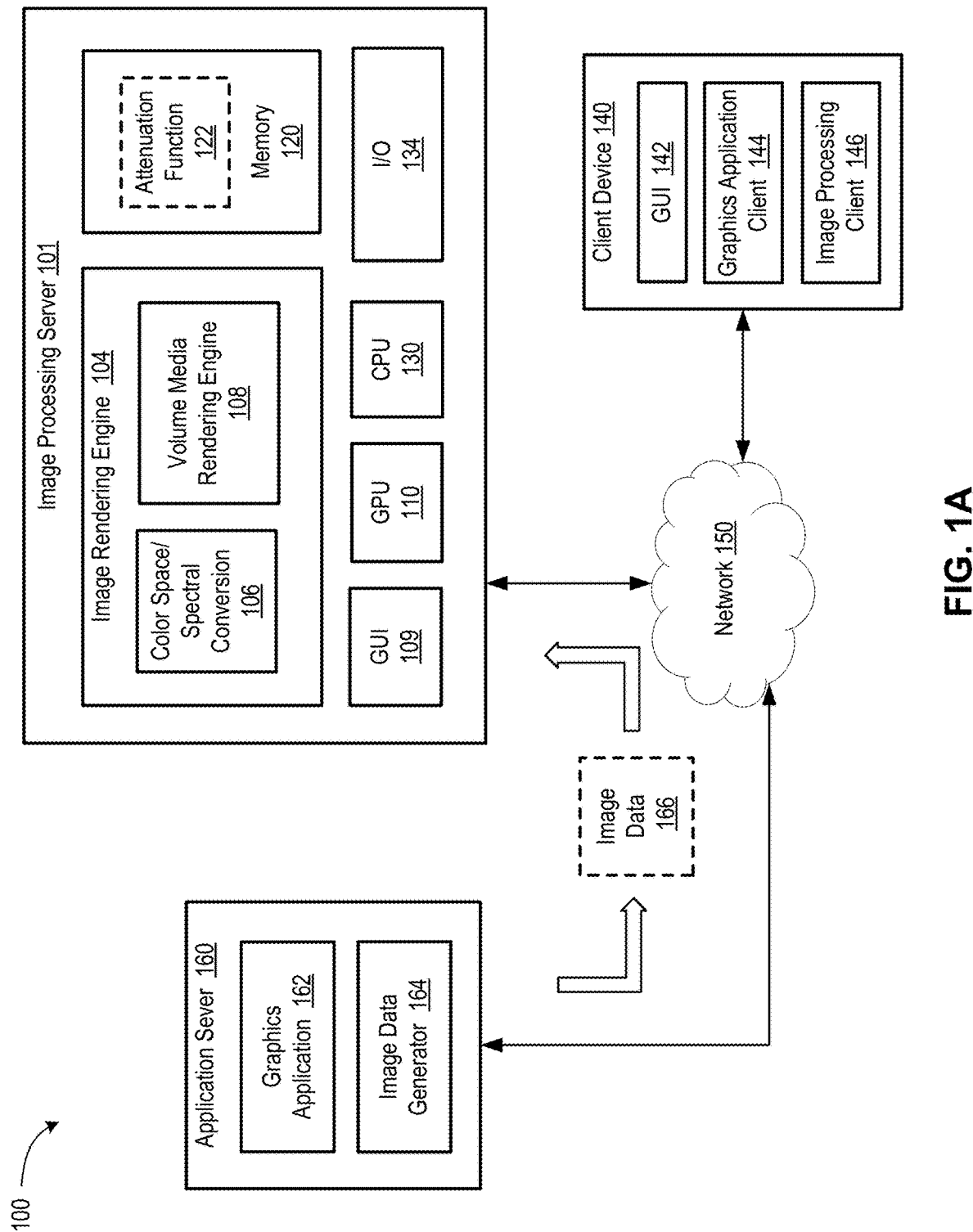
FIG. 1A is a block diagram of an example computer system that uses upsampling and an efficient attenuation function for optimized spectral rendering of light interacting with a medium having a volume attenuation, in accordance with at least some embodiments.

High quality image rendering is a computationally intensive technology that involves a large amount of processing and memory resources. Optimization of algorithms and efficient implementation of those algorithms on a hardware available to a user (developer) is, therefore, an important technological goal. Furthermore, visual perception by humans is a complex interplay of the physics of light propagation and interaction of light with material objects and physiological and neurological laws of perception of light by light receptors in the human eye, signal delivery through the optical nerve, and neural processing by the human brain. Whereas physical properties of light are determined by its spectral distribution (which describes the representation of various wavelengths/frequencies in the light), perception of color is predicated on the presence of three types of color receptors (cones) whose spectral sensitivity is loosely centered near red, green, and blue parts of the visible spectrum (380-750 nm). As a result, multiple spectral distributions of light may be perceived by the human eye as having the same color.

Color rendering in computer applications (as has also been the case with the earlier television technology) is often performed using three primary colors—red, green, and blue (RGB)—inspired by the affinity with the human perception. RGB rendering scheme involves specifying the amount of each of the primary colors (R, G, B) in some units (conventionally, in the range of [0,255] for each color). Whereas spectral intensity $I(\lambda)$ may be unambiguously converted into the RGB scheme by projecting onto three RGB color matching functions $c_j(\lambda)$ (e.g., by computing $\int d\lambda\, I(\lambda)\, c_j(\lambda)$ for each j=R,G,B and normalizing to the range [0,255]), the inverse procedure R,G,B→$I(\lambda)$ of identifying the underlying spectral intensity $I(\lambda)$ has multiple solutions (infinite in number, in fact). A variety of upsampling procedures exist that identify workable solutions that well represent a spectral distribution in a specific (e.g., natural light) environment that is mapped on the target RGB values. Such upsampling may be beneficial in generating images that are superior to those rendered in the RGB scheme. For example, spectral rendering schemes may involve realistic models of light and light-matter interaction. Such models may operate on (e.g., use as input and output) light intensity $I(\lambda)$ specified in the spectral (wavelength or, equivalently, frequency) domain. On the other hand, user data, such as sample images, is frequently provided in the RGB format.

In generating images of a scene that includes volume media (such as mist, fog, dust, water, clouds, large atmospheric depths of air), RGB (or other tristimulus) rendering may lead to results different from an output of spectral rendering. This happens because actual particles of such media scatter and absorb light of different wavelengths to a different degree. As a result, intensity of a light transmitted through a volume medium decreases with the distance L travelled through the medium, $I(L)=I(0)e^{-\mu(\lambda)L}$, with an attenuation (extinction) coefficient $\mu(\lambda)$ that depends on the wavelength $\lambda$. During propagation through (or reflection from) an actual physical medium, a monochromatic light remains monochromatic with the same wavelength (at least as long as luminescence and various nonlinear effects remain small). On the other hand, the same monochromatic light rendered in a tristimulus scheme does change its color appearance since each of the underlying tristimulus components attenuate differently. For example, the blue part of the visible range of light typically experiences much stronger scattering than the red part whereas absorption may be more pronounced for specific wavelength bands determined by atomic and molecular properties of the medium. Accordingly, a monochromatic light rendered using the RGB (or other tristimulus) scheme may experience a color shift during transmission through a volume medium (or upon reflection from the same medium) that is different from the color shift rendered in the spectral representation.

Aspects and embodiments of the present disclosure address these and other technological challenges by disclosing methods and systems that enable spectral rendering of images containing depictions of volume media which closely matches rendering of similar media in a rendering scheme utilizing several (e.g., three, four, etc.) primary colors, including but not limited to RGB color space (e.g., CIE RGB scheme), CIE XYZ color space, Academy Color Encoding System (ACES), Rec. 2020/BT.2020 color space, or any other color encoding space. The disclosed embodiments enable quick and computationally efficient real time rendering that may be used on a broad range of hardware platforms. In at least one embodiment, an attenuation function may be defined that describes color dynamics upon transmission through and/or reflection from a specific volume medium and is parameterized via a limited number of fitting parameters (e.g., two, five, or any other number). The fitting parameters may be determined by the optimization process that minimizes a difference between (i) the appearance of the transmitted/reflected light as rendered in the spectral color rendering scheme and (ii) the appearance of the same light in a target color rendering scheme (e.g., RGB, XYZ, etc.).

Although throughout this disclosure various concepts are illustrated using medical imaging examples, substantially the same or similar concepts may be used for object recognition in other contexts, such as object identification in driving or industrial environments, object recognition in security applications, in scientific and investigative research, as well as in many other applications.

System Architecture

FIG. 1A is a block diagram of an example computer system 100 that uses upsampling and an efficient attenuation function for optimized spectral rendering of light interacting with a medium having a volume attenuation, in accordance with at least some embodiments. As depicted in FIG. 1A, computer system 100 for processing image data 166 may include an image processing server 101, an application server 160, and a client device 140 connected via a network 150. Network 150 may be a public network (e.g., the Internet), a private network (e.g., a local area network (LAN), or wide area network (WAN)), a wireless network, a personal area network (PAN), or a combination thereof.

Image processing server 101 may be (or include) a desktop computer, a laptop computer, a smartphone, a tablet computer, a local server, a cloud server, a dedicated graphics server, a collection of multiple computing device, a distributed computing system, a smart TV, an augmented reality device, or any other suitable computing device (or collection of computing devices) capable of performing the techniques described herein. Application server 160 and client device 140 may similarly include any computing device referenced above. Alternatively, client device 140 may be a computing device that lacks significant computing resources but is capable of accessing and communicating with image processing server 101 and/or application server 160. Client device 140 may have a graphics user interface (GUI) 142 to facilitate user interaction with client device 140, application server 160, and image processing server 101. GUI 142 may be implemented on a desktop or laptop computer screen, touchscreen, a smart TV screen or any combination thereof. GUI 142 may include any pointing device (mouse, touchpad, stylus, finger, eye motion-controlled device, etc.), keyboard, control column, game console, and the like. GUI 142 may display stationary and moving objects, light sources, shadows, colors, menus, and so on, e.g., using a browser, a desktop application, a mobile application, etc.

Client device 140 may include a graphics application client 144 and an image processing client 146. Graphics application client 144 may be a client application provided and/or supported by a graphics application 162 running on application server 160. Graphics application 162 may be any artistic, medical, scientific, engineering application, etc. For example, graphics application 162 may be an image-making application, movie-making application, video game application, engineering application, architectural application, flight simulation application, scene reconstruction application, or the like. Graphics application 162 may operate in conjunction with an image data generator 164. Image data generator 164 may receive from graphics application 162 settings for one or more images. For example, graphics application 162 may be a video application that provides a game context, e.g., current locations of the players relative to a map of buildings. Image data generator 164 may generate coordinates of various objects, properties of surfaces of those objects (e.g., reflectivity for various directions of light incidence and reflection), locations, luminosity, and color of light emitted by various light sources, and so on.

The produced image data 166 may be provided (e.g., over network 150) to an image rendering engine 104 of image processing server 101 for generation of images, based on image data 166. In some embodiments, image data 166 may include one or more sample images to be used as base images for generation of additional images that are similar to the base images. For example, image data 166 may include several outdoor and/or indoor images of an environment to be used as a scenery for a computer game (e.g., being developed by a user of graphics application 162 via graphics application client 144). Image processing server 101 may be tasked with generating various images to support the computer game. Image processing server 101 may identify various objects and sources of light in the received images and use this data in generating additional images that involve different vantage points, different arrangement of the objects, some additional objects, different sources of light, and so on.

The generated images may be in any digital (e.g., pixel-based or vector-based) format, including but not limited to JPEG, GIF, PNG, BMP, TIFF, CIB, DIMAP, NITF, and the like. In some embodiments, the image data 166 may be provided in a color space that uses a limited number of primary colors. For brevity and conciseness, the color space specified in image data 166 is sometimes referred to herein as RGB space, but it should be understood that any tristimulus or other color space may be used instead. Image rendering engine 104 may include a color space-to-spectral conversion component 106 to convert color and intensity of various sources of light specified in image data 166 into the spectral representation: $R,G,B \rightarrow I(\lambda)$. In some embodiments, the conversion may be performed differently depending on the type of the scene and/or lighting of the scene. For example, a first type of conversion for a light reflected from a particular object may be used if the object is illuminated by natural outdoor light, and a second (and different) type of conversion may be used when the object is illuminated by indoor floodlights. A yet different third type of conversion may be used if the same object is illuminated by a street light at night.

A volume medial rendering engine 108 may determine how the converted spectral intensity $I(\lambda)$ of the light source changes upon transmission of the light through a (partially) transparent but attenuating medium. For example, volume media rendering engine 108 may determine from image data 166 that the medium is fog of a specific density. Volume media rendering engine 108 may access stored (e.g., in memory 120) light absorption and scattering data and compute, based on the fog density and the accessed data, physical attenuation function $\mu(\lambda)$ for fog. Volume media rendering engine 108 may then determine a model attenuation function that ensured consistency of spectral rendering with rendering for the same fog in the RGB space. In some embodiments, instead of specifying a type of matter, image data 166 may explicitly provide attenuation coefficients $\mu_j$ for the primary RGB colors and volume medial rendering engine 108 may then determine a model attenuation function $\mu(\lambda)$ based on maximizing the similarity between color appearance of the transmitted/reflected light in the spectral rendering scheme and the RGB rendering scheme.

Image rendering engine 104 may then use determined model attenuation function $\mu(\lambda)$ to generate an output image based on image data 166. Additionally, as depicted by a corresponding dashed block, the determined attenuation function 124 may be stored in memory 120 for reuse with subsequent images (including images generated based on image data provided by applications other than graphics application 162). In some embodiments, operations of image rendering engine 104 may be fully automated. In some embodiments, some of the operations may be controlled by a user, via GUI 109. If the user is accessing image processing server 101 remotely from client device 140, at least a portion of GUI 109 may be provided to client device 140 as GUI 142. Image processing client 146 may further facilitate interaction of the user of client device 140 with image rendering engine 104. Some operations of image rendering engine 104 that may be controlled via image processing client 146 may include: selecting a number of fitting parameters for the model attenuation function $\mu(\lambda)$, selecting a type of a target color space that the model attenuation function $\mu(\lambda)$ is intended to simulate, changing the metrics used for evaluation of the accuracy with which the model attenuation function $\mu(\lambda)$ approximates attenuation of light in the target color space, and the like.

Memory 120 may be communicatively coupled with one or more processing devices of image processing server 101, such as one or more graphics processing units (GPU) 110 and one or more central processing units (CPU) 130. Image rendering engine 104 may be executed by GPU 110 and/or CPU 130 or a combination thereof. Image processing server 101 may further include various input/output (I/O) component(s) 134 to facilitate exchange of information with various peripheral devices.

Even though image processing server 101, application server 160, and client device 140 are shown in FIG. 1A as separate devices, in various embodiments, any two (or all) of these devices may be combined on a single computing machine. For example, image processing server 101 and application server 160 may be executed on the same machine which is remotely accessed by client device 140. In another embodiment, image processing server 101, application server 160, and client device 140 may be executed on a computer (e.g., desktop or laptop) of a user (or developer).

Figure 1B:
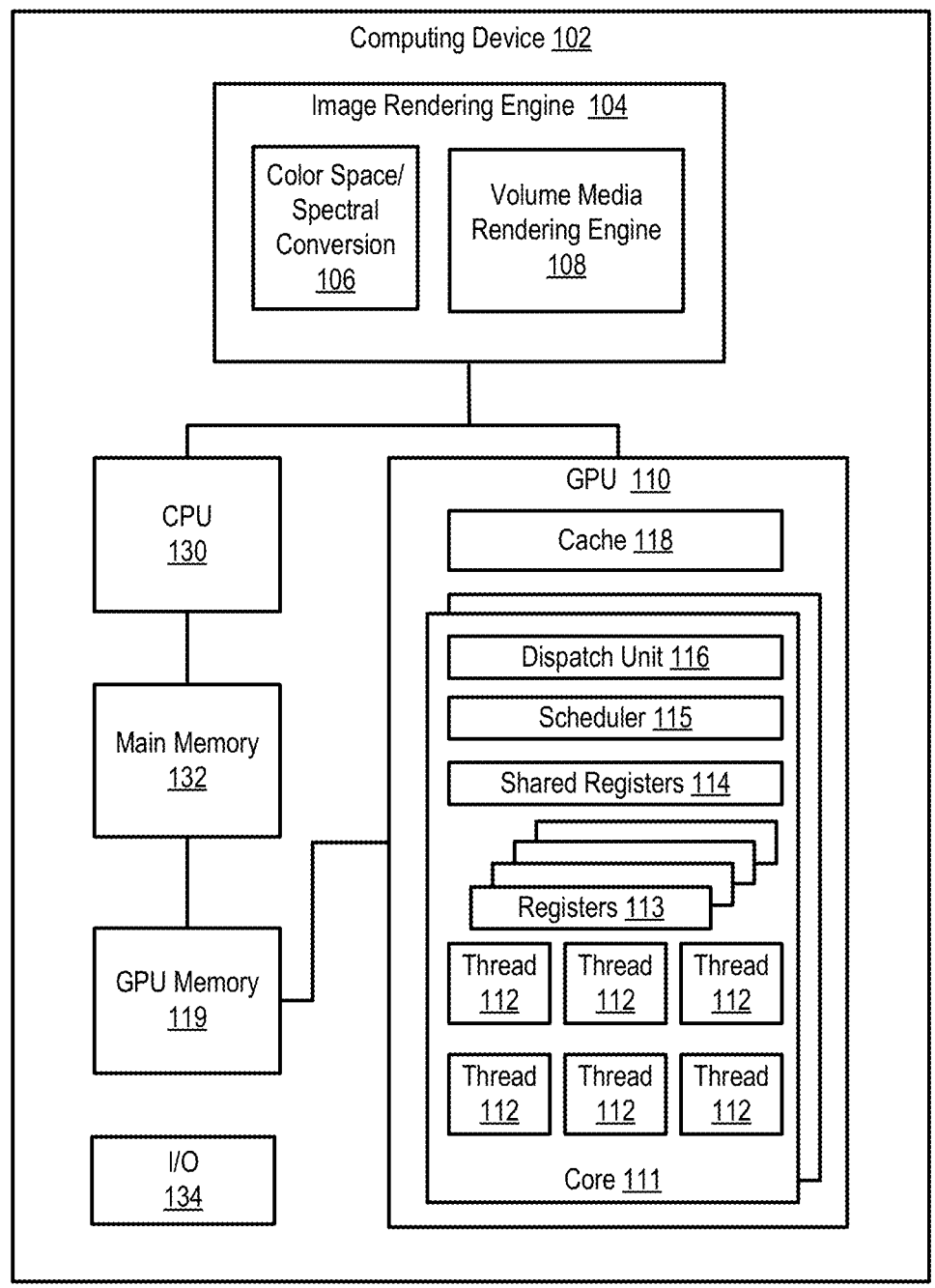
FIG. 1B is an example computing device that may implement upsampling and efficient spectral rendering of light interacting with a medium having a volume attenuation, according to at least one embodiment.

FIG. 1B is an example computing device 102 that may implement spectral upsampling and efficient spectral rendering of light interacting with a medium having a volume attenuation, according to at least one embodiment. In some embodiments, computing device 102 may be an image processing server 101 or another computing device that implements image rendering engine 104. In some embodiments, image rendering engine 104 may be executed by one or more GPUs 110 and may include color space-to-spectral conversion component 106 and volume media rendering engine 108 to perform spectral upsampling and simulation of volume media in spectral representation. In some embodiments, a GPU 110 includes multiple cores 111, each core being capable of executing multiple threads 112. Each core may run multiple threads 112 concurrently (e.g., in parallel). In some embodiments, threads 112 may have access to registers 113. Registers 113 may be thread-specific registers with access to a register restricted to a respective thread. Additionally, shared registers 114 may be accessed by all threads of the core. In at least one embodiment, each core 111 may include a scheduler 115 to distribute computational tasks and processes among different threads 112 of core 111. A dispatch unit 116 may implement scheduled tasks on appropriate threads using correct private registers 113 and shared registers 114. Computing device 102 may include input/output component(s) 134 to facilitate exchange of information with peripheral devices, as well as users and developers.

In some embodiments, GPU 110 may have a (high-speed) cache 118, access to which may be shared by multiple cores 111. Furthermore, computing device 102 may include a GPU memory 119 where GPU 110 may store intermediate and/or final results (outputs) of various computations performed by GPU 110. After completion of a particular task, GPU 110 (or CPU 130) may move the output to (main) memory 132. In some embodiments, CPU 130 may execute processes that involve serial computational tasks (such as optimization of the attenuation function) whereas GPU 110 may execute tasks (such as rendering of images using the optimized attenuation functions) that are amenable to parallel processing. In some embodiments, image rendering engine 104 may determine which processes are to be executed on GPU 110 and which processes are to be executed on CPU 130. In other embodiments, CPU 130 may determine which processes are to be executed on GPU 110 and which processes are to be executed on CPU 130.

Figure 2:
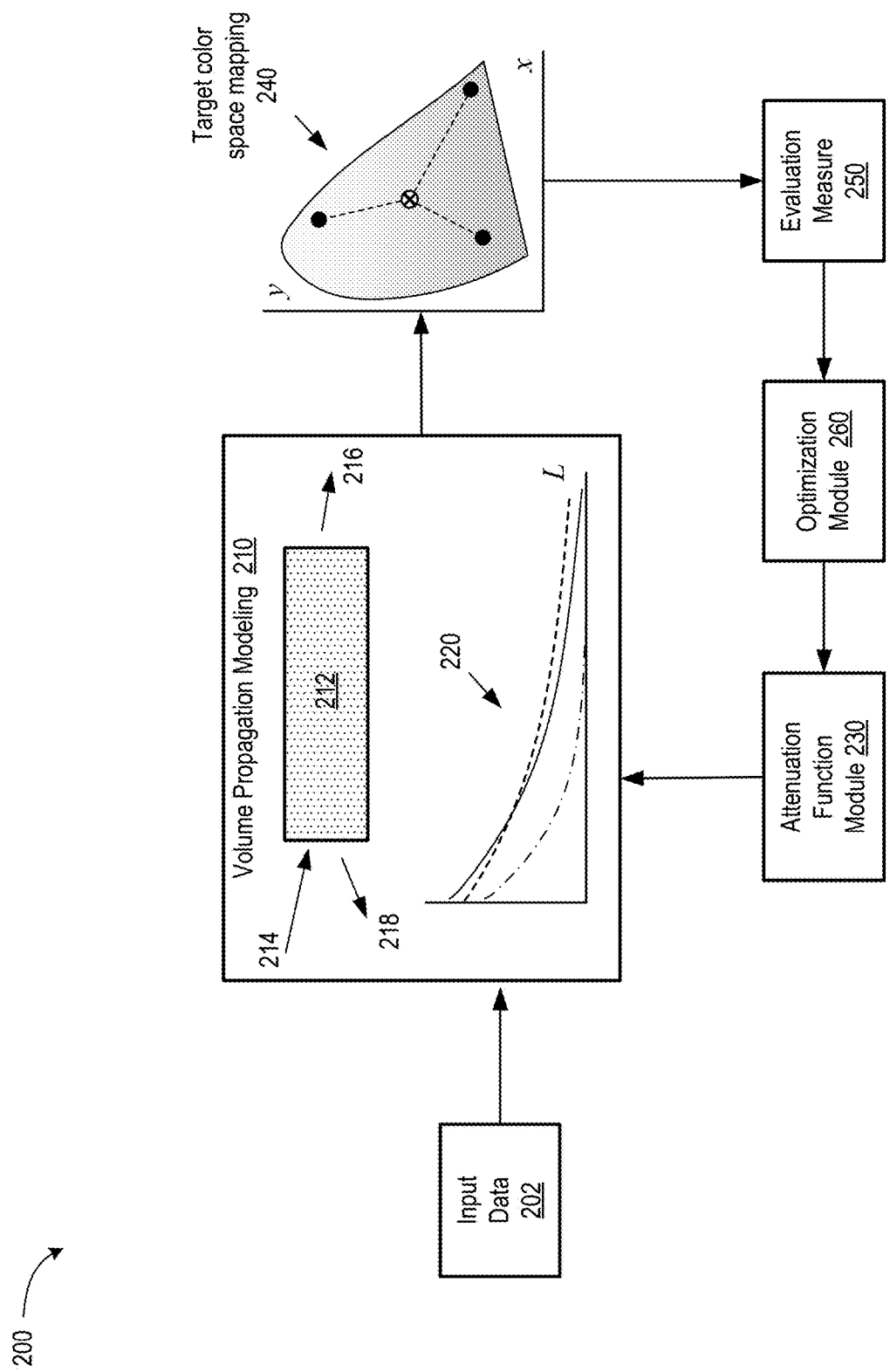
FIG. 2 illustrates an example data flow that may be used to obtain an efficient attenuation function for optimized spectral rendering of light interacting with a medium having a volume attenuation, in accordance with at least some embodiments.

FIG. 2 illustrates an example data flow 200 that may be used to obtain an efficient attenuation function for optimized spectral rendering of light interacting with a medium having a volume attenuation, in accordance with at least some embodiments. As depicted schematically, input data 202 may be provided to volume propagation modeling 210. Input data 202 may include a description of one or more volume media that are present in a scene being rendered. A scene may be associated with an outdoor or indoor environment having any number of objects and light sources, such as emissive light sources (sun, electric bulbs/light emitting diodes, natural or industrial fires, etc.), reflective light sources (e.g., mirrors, surfaces of liquid substances, glossy surfaces, matte surfaces, etc.), diffusive/scattering light sources (e.g., atmosphere, particulate matter, etc.). Some of the objects may at the same time be light sources. Input data 202 may include locations (e.g., coordinates in image space), size, orientation, and properties of various objects and light sources. Properties of light sources may include characterizations of their radiance, direction, color of emitted (or reflected/scattered) light. Properties of objects may include characterization of the objects' surfaces, such as a spectral reflectance, transmittance, absorptivity for various directions of incident and reflected/transmitted light (e.g., bidirectional scattering function). In some embodiments, the image to be rendered is a part of a dynamic sequence of images (frames) in which objects and/or light sources are moving relative to a viewer. For example, such a sequence of images may correspond to a stationary viewer observing moving objects, a moving viewer observing stationary objects, or a moving viewer observing moving objects.

Input data 202 may allow image rendering engine 104 to render one or more images, which may include simulating how much light (and of what color) various elements (e.g., pixels or voxels) of the image are to receive from various objects in the scene. As input data 202 may specify, the scene may include objects and media that are characterized by a volume attenuation of light that interacts with the media, e.g., light that propagates through (transmits), reflects or scatters from the media. Media may include any gaseous substance (e.g., atmospheric air), liquid substance (e.g., water, oil, drinks, etc.), solid substance at least partially transparent to light (e.g., glass, plastic, ice, etc.), or any suspension, solution, or a combination of the above (e.g., fog, mist, dust, etc.) In the following, a reference is made to a single medium, for brevity and conciseness, but it should be understood that multiple media present in the scene may be treated in a substantially similar fashion. Input data 202 may indicate how strongly the light interacts with a medium. For example, the medium may be characterized with an absorption coefficient $\mu_a$, and a scattering coefficient $\mu_s$. The absorption coefficient $\mu_a$ specifies a fraction of the light that is absorbed by the medium over a unit distance of the light's propagation. Similarly, the scattering coefficient $\mu_s$ specifies a fraction of the light that is scattered by the medium over the unit distance.

As a consequence of absorption and scattering, the intensity of light may decrease exponentially with the distance of propagation, $$I(L)=I(0)e^{-\mu L},$$

where $\mu$ is the extinction coefficient. In some embodiments, e.g., where multiple scattering of light may be disregarded, the extinction coefficient may be approximated as the sum, $\mu=\sigma_a+\sigma_s$ of the absorption coefficient and the scattering coefficient. In some embodiments, where multiple scattering of light is taken into account, the extinction coefficient may depend non-linearly on the absorption and scattering coefficients. In one example embodiment, as described below, the extinction coefficient may be approximated as, $\mu=\sqrt{\sigma_a^2+2\sigma_a\sigma_s}$. In some embodiments, other forms of the attenuation coefficient $\mu$ may be used.

Attenuation (from scattering and/or absorption) is, generally, dependent on a wavelength (or, equivalently, frequency) of light. For example, $\sigma_s(\lambda)$ may be larger at shorter wavelengths $\lambda$ (e.g., blue light) than at longer wavelengths (e.g., red light). Likewise, a particular medium may have stronger absorption $\sigma_a(\lambda)$ at some specific color (e.g., red) and weaker absorption at other wavelengths. As a result, a monochromatic light may attenuate with the passing distance L, $$I(\lambda,L)=I(\lambda)e^{-\mu(\lambda)L},$$

with the attenuation coefficient $\mu(\lambda)$ that depends on the wavelength $\lambda$ of the light. When a non-monochromatic light propagates through the medium (or otherwise interacts with it), the spectrum of the light may change since different spectral components may attenuate differently. Correspondingly, an appearance of the incident light to a human viewer before the interaction of the light with the medium may be different from an appearance of the transmitted light after the interaction with the medium (e.g., the transmitted light is perceived as having a different color). It should be understood that the exponential dependence of intensity on the distance L is intended for illustration purposes only. In some embodiments, the attenuation coefficient may be position-dependent, e.g., $\mu(\lambda,z)$. In such embodiments, intensity of the light may be determined by an integral of the attenuation coefficient over distance travelled by light, $I(\lambda,L)=I(\lambda)\exp(-\int_0^L \mu(\lambda,z)dz)$. Throughout this disclosure, for brevity and conciseness, a simple exponential attenuation in uniform volume media is referenced, but substantially the same techniques may be used for heterogeneous media.

Input data 202 may include information allowing the capture of such a change in color. For example, input data may include an image (e.g., a digital photograph) of an actual scene. The image may use a tristimulus color space (e.g., RGB, XYZ, ACES, etc.) or some other target colors space having N reference colors (e.g., red, green, blue, and/or some other colors). Each reference color j may be associated with a respective color matching function $c_j(\lambda)$ defined in an interval of wavelengths $[\lambda_{min},\lambda_{max}]$, which may be a visible range ($\lambda_{min}$=380 nm, $\lambda_{max}$=700 nm) or some other range. For example, in industrial, medical, and automotive (e.g., autonomous vehicle) applications, various other ranges of electromagnetic waves (e.g., infrared, ultraviolet, x-ray, etc.) may be used. The term "light" should be understood to encompass all such pertinent ranges of electromagnetic waves and is not meant to be limited to the visible range of wavelengths. A light with a given spectral intensity $I(\lambda)$ may be represented in the target color space with values $[a_1, a_2, \ldots, a_N]$ determined by projecting the spectral intensity $I(\lambda)$ onto the respective color matching function: $a_j=\int_{\lambda_{min}}^{\lambda_{max}}d\lambda\ I(\lambda)c_j(\lambda)$.

The image in input data 202 may have information about a color of light incident on a volume medium (e.g. as determined from direct view of a source of the light or other objects illuminated by the light) as well as a color of the light transmitted through the medium. In some instances, the incident light may be a known light (e.g., D65 natural light in RGB color space). In some instances, the transmitted light may pass through a cloud of a known (e.g., ascertainable from image) thickness L. In some embodiments, volume media rendering engine 108 may identify that an incident light in the image has a representation $[a_1, a_2, \ldots, a_N]$ in the target space. Volume media rendering engine 108 may further determine (e.g., from the known or estimated thickness L of the medium), that the transmitted light has a representation $[b_1, b_2, \ldots, b_N]$ that is different from the representation of the incident light. The volume attenuation coefficients $\mu_j$ for various primary colors j of the target space may be identified as $\mu_j = L^{-1} \ln(a_j/b_j)$, so that each of the primary colors attenuates with the respective coefficient $\mu_j$, meaning that the transmitted light attenuates with the distance as:

Incident light: $[a_1, a_2, \ldots, a_N]$,
Transmitted light: $[a_1 e^{-\mu_1 L}, a_2 e^{-\mu_2 L}, \ldots, a_N e^{-\mu_N L}]$.

Attenuation coefficients $\mu_j$ may potentially be different for different primary colors, e.g., in the RGB target color space, $\mu_R \neq \mu_G \neq \mu_B$. In some embodiments, attenuation coefficients $\mu_j$ may be provided with input data 202, rather than ascertained from an existing image. For example, an application (e.g., graphics application 162 or image data generator 164) may explicitly specify attenuation coefficients, in the target space, for various media to be rendered. To identify what attenuation function $e^{-\mu(\lambda) L}$ in the spectral representation should be used to match the appearance and color of the image (existing or being rendered) in the target color space, volume media rendering engine 108 may perform some of the operations described below.

As depicted schematically with a volume propagation modeling 210 box, a spectral intensity $I(\lambda)$ of light 214 incident on a medium 212 may first be determined. In some embodiments, spectral intensity $I(\lambda)$ may be known independently, e.g., natural light may be present in a daytime image of an outdoor scene. In some embodiments, $I(\lambda)$ may be specified by a developer. In some embodiments, $I(\lambda)$ may be ascertained from the image based on color appearance of objects in the image that are not obscured by medium 212. In those instances where spectral intensity $I(\lambda)$ is not known explicitly (e.g., not provided with input data 202), and only a representation $[a_1, a_2, \ldots, a_N]$ in the target color space is available, volume media rendering engine 108 may first select a conversion $[a_1, a_2, \ldots, a_N] \rightarrow I(\lambda)$ from possible spectral intensities that would have the right representation, $[a_1, a_2, \ldots, a_N]$, in the target color space.

Volume media rendering engine 108 may also identify how primary colors attenuate with distance L (as depicted with a schematic plot 220), e.g., by identifying the respective attenuation coefficients µj explicitly provided in input data 202, ascertaining attenuation coefficients from an image included in input data 202, accessing database of properties of various media, and so on. Similarly to how attenuation coefficients $\mu_j$ characterize transmitted light 216, additional reflection coefficients $r_j$ may be similarly obtained that describe how reflected light 218 is represented via primary colors in the target color space, e.g., $[r_1 \cdot a_1, r_2 \cdot a_2, \ldots, r_N \cdot a_N]$. Although for conciseness, various embodiments are described in conjunction with transmitted light, substantially similar operations may be used to simulate attenuation function, e.g., spectral reflectance $r(\lambda)$, of volume media, to obtain maximum similarity with the reflected light rendered in the target space.

Figure 3A:
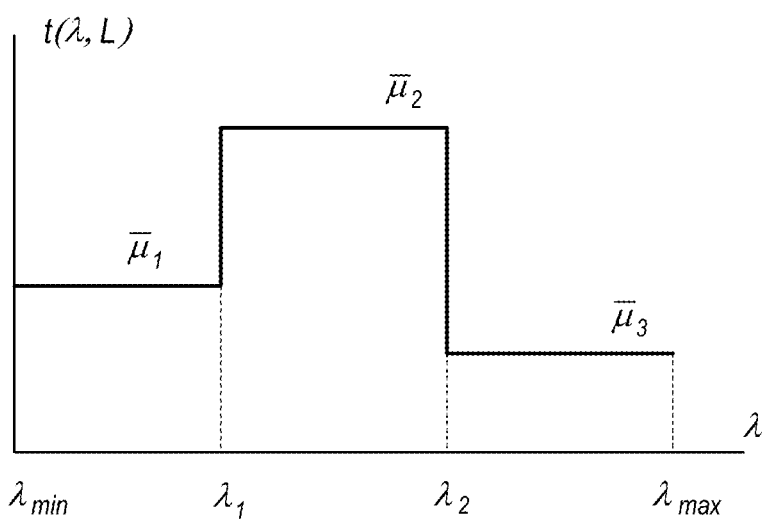
FIG. 3A and FIG. 3B illustrate examples of possible forms of an attenuation function that may be used for optimized spectral rendering of light interacting with a medium, in accordance with at least some embodiments.
Figure 3B:
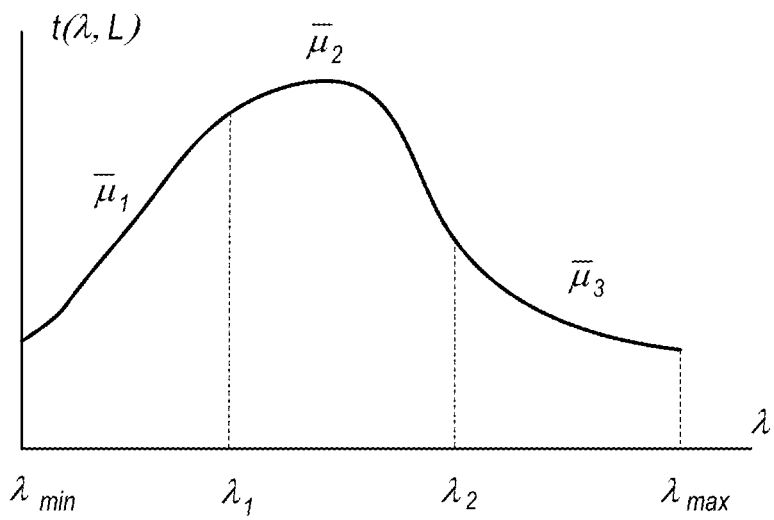

Volume media rendering engine 108 may then define, using attenuation function module 230, a form of an attenuation function $t(\lambda, L)$ as a model function of wavelength, which may relate intensity of transmitted light to the intensity of incident light: $I(\lambda, L) = t(\lambda, L) \cdot I(\lambda)$. (Similarly, an attenuation function for reflection $r(\lambda)$ may be defined, which relates intensity of reflected light to the intensity of incident light: $I_R(\lambda) = r(\lambda) \cdot I(\lambda)$.) Attenuation function may be modeled in a variety of ways. FIG. 3A and FIG. 3B illustrate examples of possible forms of an attenuation function $t(\lambda, L)$ that may be used for optimized spectral rendering of light interacting with a medium, in accordance with at least some embodiments. FIG. 3A depicts a piecewise-constant function 300 of the wavelength of light. FIG. 3B depicts a continuous function 310 of the wavelength of light. As a function of distance L, attenuation function $t(\lambda, L)$ may be continuous, e.g., an exponentially decreasing function of distance L, even though a non-exponential (e.g., power-law) function of distance L may be used, in some embodiments. Attenuation function may be defined at least in the interval of light of interest, $[\lambda_{min}, \lambda_{max}]$, e.g., the visible range of light or any other range of wavelengths. Attenuation function may depend on one or more parameters. In one particular non-limiting example, attenuation function may assume N values in N regions separated by N−1 boundaries $\lambda_\alpha$ (e.g., function 300 depicted in FIG. 3A for N=3).

$$t(\lambda, L) = \begin{cases} \exp(-\bar{\mu}_1 L), & \lambda_{min} \leq \lambda < \lambda_1, \\ \exp(-\bar{\mu}_2 L), & \lambda_1 \leq \lambda < \lambda_2, \\ \exp(-\bar{\mu}_3 L), & \lambda_2 \leq \lambda < \lambda_{max}. \end{cases}$$

In one embodiment, parameters $\bar{\mu}_s$ may be taken equal to attenuation coefficients $\mu_j$ in the target space, while the set of boundaries $\{\lambda_\alpha\}$ is determined by optimization. In another embodiment, parameters $\bar{\mu}_s$ are also determined by optimization, together with boundaries $\{\lambda_\alpha\}$. In yet another embodiment, parameters $\bar{\mu}_s$ may be used to parameterize a continuous attenuation function (e.g., as depicted in FIG. 3B), e.g. a polynomial function, a piecewise-polynomial function, or any other function of A. For example, value $\bar{\mu}_1$ may refer to the average value of the attenuation function (or its logarithm $-L^{-1} \log t(\lambda, L)$) in the interval $[\lambda_{min}, \lambda_1]$ (with value $\bar{\mu}_2$ similarly related to the interval $[\lambda_1, \lambda_2]$, and so on). As another example, parameters $\bar{\mu}_s$ may refer to the maximum value of the attenuation function (or its logarithm $-L^{-1} \log t(\lambda, L)$) in the respective interval or to the value of the attenuation function (or its logarithm $-L^{-1} \log t(\lambda, L)$) at a midpoint of the respective interval (e.g., value $\bar{\mu}_1$ may be related to the value of the attenuation function or its logarithm at $(\lambda_{min}+\lambda_1)/2$). A practically unlimited number of different attenuation functions, which embody various mappings $\mu_j \rightarrow \bar{\mu}_s$, may be used.

Referring back to FIG. 2, volume media rendering engine 108 may determine, using the defined model attenuation function and some initial values for the parameters $\lambda_\alpha$ (and, optionally, $\bar{\mu}_s$, if $\bar{\mu}_s$ are subject to optimization) may compute a spectral distribution of the transmitted light, $I(\lambda, L) = t(\lambda, L) \cdot I(\lambda)$. Next, volume media rendering engine 108 may project the computed intensity $I(\lambda, L)$ onto the color matching functions $c_j(\lambda)$ to obtain a representation of transmitted light, $[d_1, d_2, \ldots, d_N]$, in the target color space, $$d_j = \int_{\lambda_{min}}^{\lambda_{max}} d\lambda I(\lambda, L) c_j(\lambda),$$

and perform mapping 240 of the obtained representation to the target color space. As described in more detail below in relation to FIGS. 4A-C, some evaluation measure 250 may be used to evaluate how closely the attenuation function that is based on the initial parameters represents the transmitted light in the target color space. An optimization module 260 may subsequently determine how the initial parameters of the attenuation function may be adjusted to improve the similarities between the two representations. After the attenuation function module 230 adjusts the parameters of the attenuation function, the process represented by the loop in FIG. 2 may be repeated until optimization module determines that a desired (e.g., pre-determined) accuracy is reached. The attenuation function (with the determined optimized parameters) may then be used for image rendering using the spectral representation. Such image rendering may be performed for the same image whose incident light intensity $I(\lambda)$ and transmitted light intensity $I(\lambda,L)$ have been used for the optimization of the attenuation function. Additionally, the determined attenuation function may be used to render subsequent images having similar media and various other incident light intensities $I_1(\lambda), I_2(\lambda), \ldots$, etc.

Figure 4A:
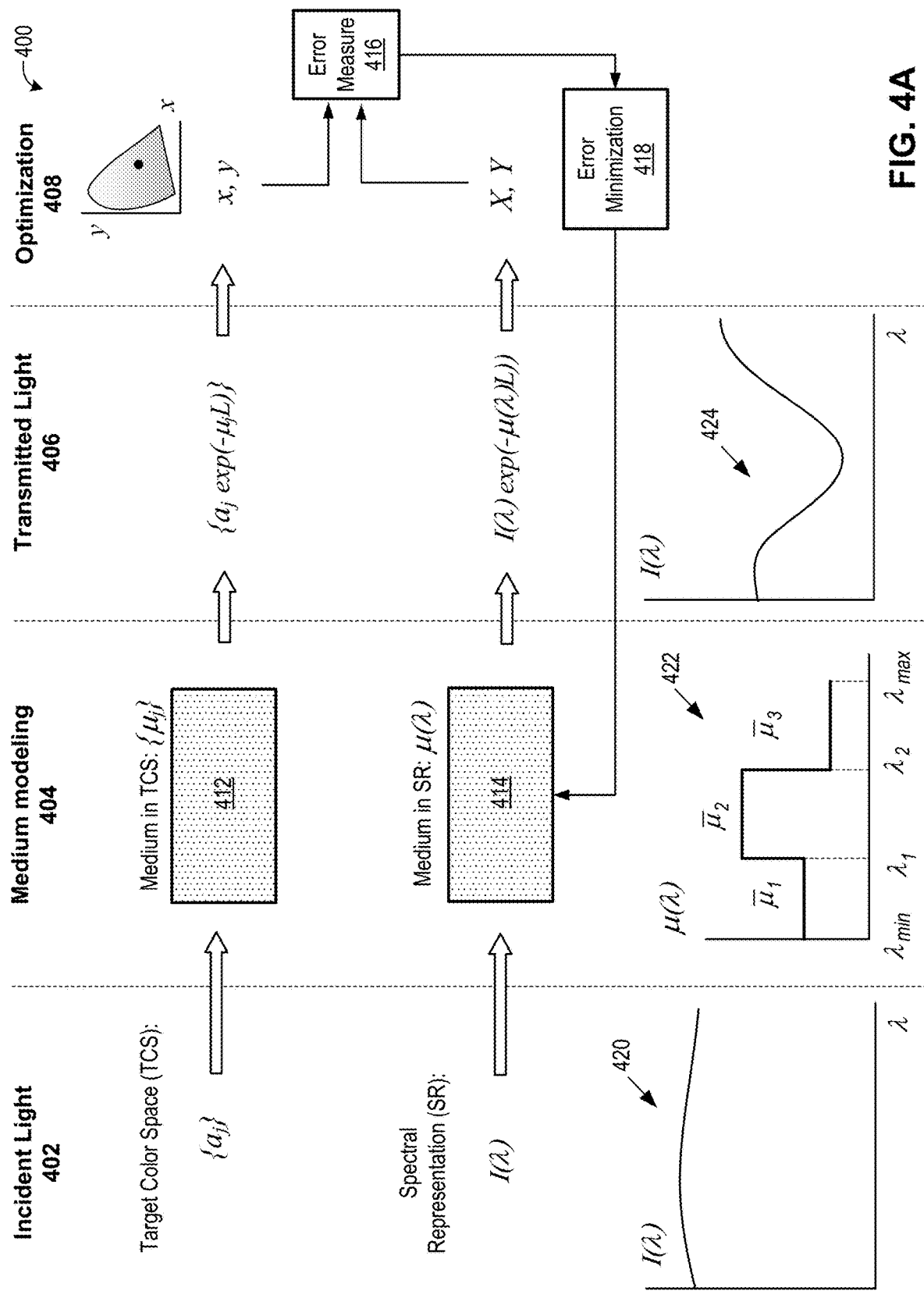
FIG. 4A and FIG. 4B illustrate example evaluation schemes to evaluate accuracy of rendering of light interaction with an optimized attenuation function, in accordance with at least some embodiments.

FIG. 4A illustrates an example evaluation scheme 400 to evaluate accuracy of rendering of light interaction with a volume medium using an optimized attenuation function, in accordance with at least some embodiments. Shown schematically are four stages of evaluation scheme 400: selecting an incident light 402, performing medium modeling 404, computing transmitted light 406, and performing optimization 408. First, an incident light 402 may be selected. The incident light may be defined in a tristimulus (or any other) target color space (e.g., XYZ or sRGB), e.g., via a set of tristimulus values $\{a_j\}$. Incident light 402 may be a primary color of the target color space or any mixture of two or more primary colors of the target color space. Incident light 402 may be any light source, such as and without limitation, a white light, a natural outdoor light, or any other combination of colors. Incident light 402 may also be represented (e.g., using various color upsampling techniques) via its spectral intensity $I(\lambda)$ 420. A transmitted light 406 may then be obtained in both representations. For example, using known attenuation coefficients $\{\mu_j\}$ for respective primary colors in a volume medium 412, transmitted light 406 in the target color space may be obtained, $\{a_j e^{-\mu_j L}\}$, for a given length $L$ of the medium. Similarly, the intensity of transmitted light in the spectral representation 424 may further be obtained, $I(\lambda)e^{-\mu(\lambda)L}$, using model attenuation coefficient $\mu(\lambda)$ 422 (for a model volume medium 414) that may have one or more optimization parameters. In some embodiments, instead of the exponential attenuation function $e^{-\mu(\lambda)L}$, some other attenuation function of a more general form $t(\lambda,L)$ may be used.

Transmitted light 406 in both the target color space and the spectral representation may be characterized on an equal footing using a two-dimensional chromaticity plane in some color space (e.g., XYZ or sRGB), which may be the same or different from the target color space. In some embodiments, chromaticity plane xy may be the chromaticity plane of the CIE XYZ color space. As used in FIG. 4A, transmitted light 406 in the target color space may map on the chromaticity values (x,y) whereas the same transmitted light in the spectral representation may map on chromaticity values (X,Y). An error measure 416 used to characterize the accuracy of the selected parameters for the attenuation function may be some function $f(X,Y;x,y)$ of chromaticity values X, Y of transmitted light in the spectral representation and chromaticity values x,y of the transmitted light in the target color space. For example, the error measure may be based on the Euclidean distances between the respective coordinates, $f(X,Y;x,y)=(X-x)^2+(Y-y)^2$. An error minimization module 418 may use the determined error measure to modify the parameters of the attenuation coefficient (or, more generally, attenuation function) to reduce the error measure. Although in the above example, only relative chromaticities (but not the total intensity) of two transmitted lights are compared, in some embodiments the total intensities of the transmitted light may also be compared, $f=(X-x)^2+(Y-y)^2+w(I-i)^2$, where $I$ is the total intensity of the transmitted light in the spectral representation, and $i$ is the total intensity of the transmitted light in the target color space. A weight $w$ may describe the importance of the color perception relative to the brightness perception and may be determined from empirical testing. Similarly, in some embodiments, the full set of three (not normalized to the unit brightness) chromatic values may be used (e.g. X, Y, Z). The error measure 416 may then be a sum of Euclidean distances in the three dimensional space of chromatic values. In some embodiments, the distances along each chromaticity axis may be weighed differently, $f=\alpha\cdot(X-x)^2+\beta\cdot(Y-y)^2+\gamma\cdot(Z-z)^2$, with weights $\alpha, \beta, \gamma$, at least some of which may be unequal. In some embodiments, error measure 416 may be defined for an ensemble of different incident lights, such as, $$f = \sum_i \sqrt{(X_i - x_i)^2 + (Y_i - y_i)^2 + (Z_i - z_i)^2},$$

where index $i$ enumerates various incident lights. In some embodiments, measure $f$ may weigh errors along two (or three) axes using different functions, e.g., $f=\Sigma_i[a\cdot|X_i-x_i|^k + b\cdot|Y_i-y_i|^l]$ with different $k \neq l$.

Figure 4B:
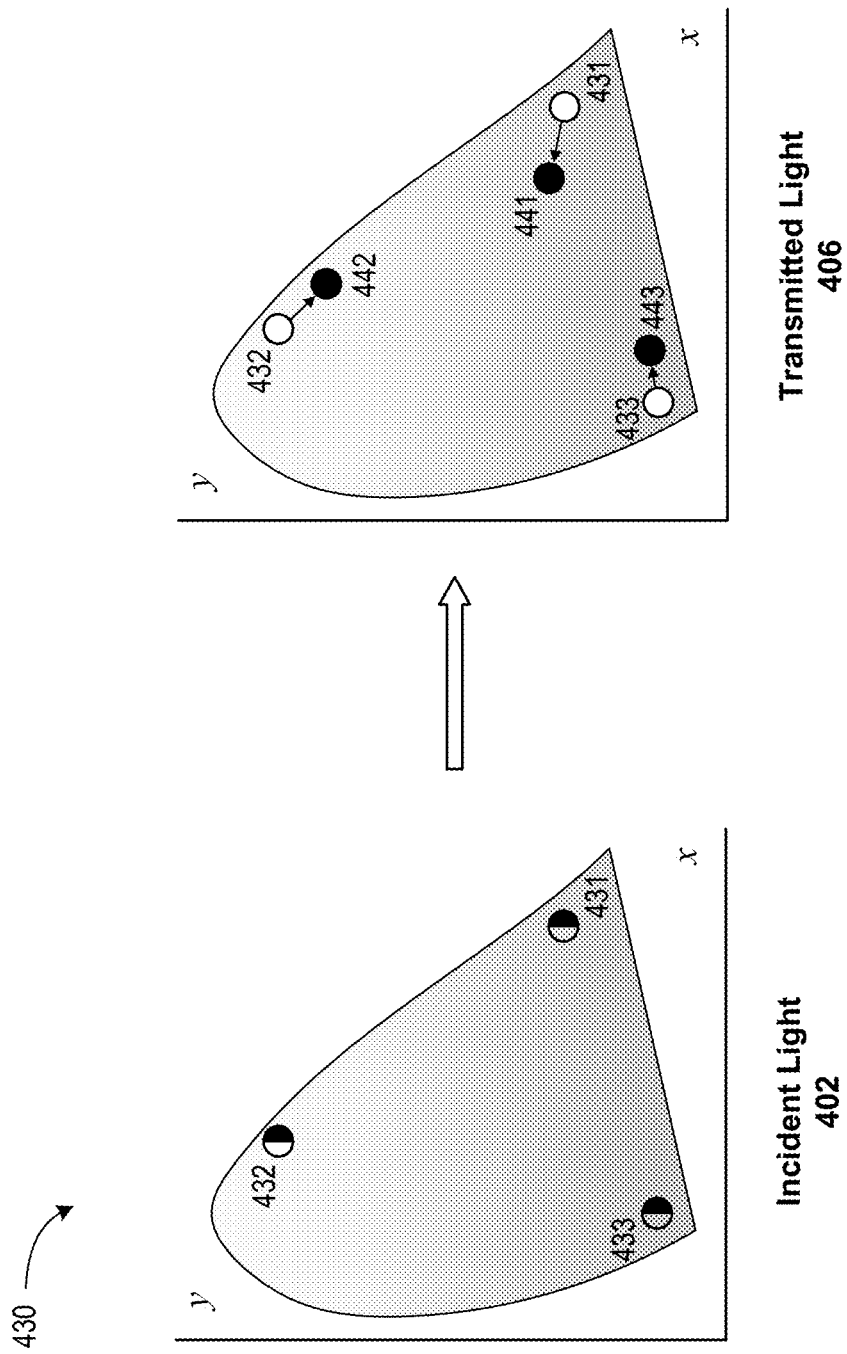

In one example, the three incident lights may be the primary colors of a target color space. FIG. 4B illustrates attenuation function optimization 430 using primary colors of a target space, in accordance with at least some embodiments. The inside portion of the shaded region in FIG. 4B corresponds to various colors that may be perceived by a human eye. Chromaticity values x and y characterize relative presence of three primary colors. White circles depict chromaticity of light in the target color space, black circles depict chromaticity of light in the spectral representation, and black/white circles depict light having the same chromaticity (perceived color) in both representations. Illustrated in FIG. 4B are three primary colors: first primary color 431, second primary color 432, and third primary color 433. As depicted in FIG. 4B, an incident light (left panel) 431 that is the same in both representations, maintains its color in the target space after transmission (right panel) but shifts, in the spectral representation, to a new color described by chromaticity values x and y depicted by point 441. Similarly, the second (third) primary colors shifts, in the spectral representation, from point 432 (point 433) to point 442 (point 443). Error measure 416 used for optimization of the attenuation functions may be any of the distances 431-441, 432-442, and/or 433-443 individually or in combination (e.g., the sum of the distances, the sum of the squares of the distances, a weighted sum, and the like). Optimization may be performed until error measure 416 is minimized.

Figure 4C:
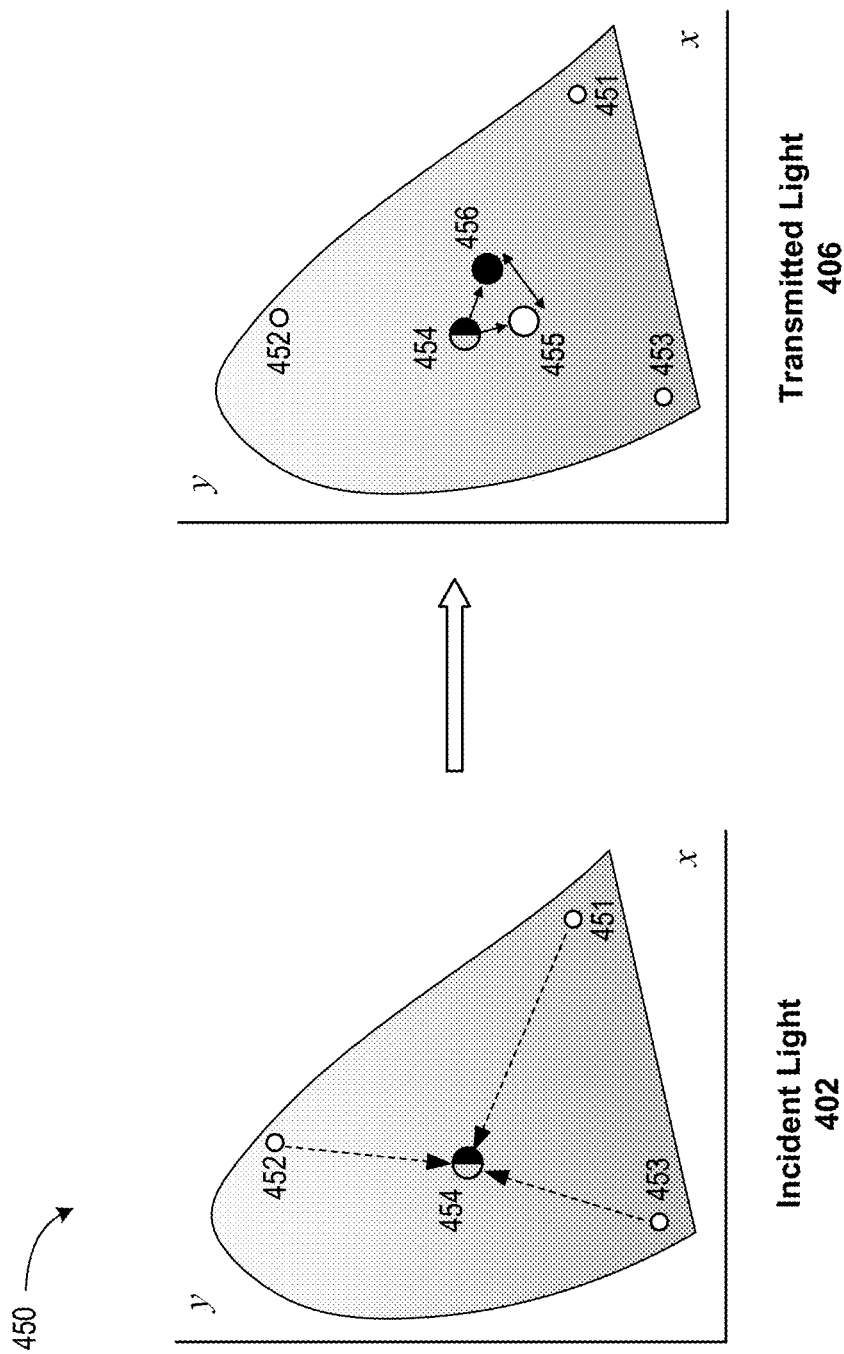
FIG. 4C illustrates attenuation function optimization 450 using a combination of primary colors of a target space, in accordance with at least some embodiments

In another example, an incident light may be any combination of primary colors of a target color space. FIG. 4C illustrates attenuation function optimization 450 using a combination of primary colors of a target space, in accordance with at least some embodiments. Illustrated in FIG. 4C (left panel) is an incident light having the same representation in the target color space and in the spectral representation (as depicted by black/white circle 454). After transmission (right panel) the incident light shifts, in the target color space, to a point 455 (as depicted by the corresponding white circle). The same transmitted light shifts, in the spectral representation, to a different point 456 (as depicted by the corresponding black circle). Error measure 416 used for optimization of the attenuation function may be the distance 455-456. Optimization may be performed until error measure 416 is minimized. Even though a single incident/transmitted light is depicted in FIG. 4C, optimization may be performed based on a sum of error measures of multiple incident/transmitted lights, as described in more detail above.

Optimization of parameters of the attenuation function may be performed iteratively using any optimization algorithms, including gradient descent, finite difference, Newton method, Hessian-based methods, Golden Ration method, and the like. After parameters are adjusted, the location of the point (X, Y) corresponding to the transmitted light in the spectral representation may be recomputed and a new value of the measure of error $f$ may be determined. Optimization may be performed until one or more accuracy conditions are met, e.g., until the measure of error $f$ becomes smaller than a predetermined threshold value $f_T$. Alternatively, optimization may be performed until two or more subsequent iterations fail to improve the measure of error by at least a certain value $\Delta f$ or a certain percent of the measure (e.g., 5%, 10%, etc.).

In some embodiments, parameters of the attenuation function may be determined using a single spectral distribution $I(\lambda)$ of incident light. In at least some embodiments, optimization may involve multiple spectral distributions $I_k(\lambda)$. A separate measure of error $f_k$ may be computed for each distribution $I_k(\lambda)$ and optimization may be performed based on all measures $f_k$. For example, a global measure of error may be formed, $F=\Sigma_k f_k$ (or $F=\Sigma_k f_k^2$ or some other global measure). Parameters of the attenuation function may then be determined from the optimization of the global measure of error F, substantially as described above. In some embodiments, optimization may be performed for a single spectral distribution but multiple distances L. In some embodiments, optimization may be performed based on multiple spectral distributions and multiple distances.

Although the above description of identification of an optimized attenuation function referred to a specific (e.g., known) medium, substantially similar operations may be performed when a single attenuation function is to be used for rendering images that may contain multiple media. For example, in some instances an image, which needs to be rendered, may have one or more media whose specific attenuation coefficients (in the target color space) may be unknown. In such instances, a pre-computed universal attenuation function may be used that is optimized for rendering a variety of volume media that are likely to be encountered in images of a similar type, e.g., fog, dust, mist, clouds, water, and the like. Such a universal attenuation function may be determined by optimizing a global error measure $F=\Sigma_k f_k$ determined for a number (e.g., m) of volume media whose attenuation coefficients are available. (In some embodiments, only some of the attenuation coefficients for a particular medium may be known, e.g., known for red and green primary colors but not for blue color.) Furthermore, in such instances, the global error measure may include a number (e.g., n) of different incident lights (for the total of n×m different contributions to the global error measure $F=\Sigma_k f_k$). The universal attenuation function obtained in this way may then be used for rendering new volume media not previously used during optimization.

The following table shows example boundaries $\lambda_\alpha$ obtained by optimization within the interval $\lambda \in [380$ nm, 780 nm] for various tristimulus color spaces using 5 nm discretization for calculation of integrals over wavelength.

| Color Space | $\lambda_1$ | $\lambda_2$ |
| --- | --- | --- |
| XYZ | 500 nm | 575 nm |
| sRGB | 485 nm | 595 nm |
| ACES | 505 nm | 550 nm |
| ACEScg | 505 nm | 570 nm |
| Rec2020 | 500 nm | 570 |

The values listed in this table are obtained by using a white illuminant and three different media, one for each primary (431, 432, and 433 of FIG. 4B), and an error measure that is a sum of all three distances, 431-441, 432-442, and 433-443.

Although the above embodiments are described in relation to attenuation of transmitted light, color matching may similarly be performed, in a similar manner, for light reflected from a medium having both scattering and absorption. In at least one embodiment, light propagating in the forward direction $I_T$ and light propagating in the backward direction $I_R$ may be modeled via coupled equations:

$$\frac{dI_T}{dz} = -\sigma_a I_T + \sigma_s(I_R - I_T),$$

$$-\frac{dI_R}{dz} = -\sigma_a I_R + \sigma_s(I_T - I_R),$$

where z is the distance travelled by the beam of light; the terms $\sigma_a I_T$ and $\sigma_a I_R$ describe absorption of the respective light and the terms $\pm\sigma_s(I_R - I_T)$ describe scattering effects, e.g., reduction in the intensity of forward-propagating light $I_T$ due to scattering into backward-propagating light $I_R$ and increase in the intensity of forward-propagating light $I_T$ due to scattering of backward-propagating light $I_R$.

The above equations indicate that the intensity of the forward-propagating light depends on the distance z as $$I_T(z) = I_0 e^{-\mu z}, \; I_R(z) = I_0 \frac{\sigma_s}{\mu + \sigma_a + \sigma_s} e^{-\mu z}, \; \mu = \sqrt{\sigma_a^2 + 2\sigma_a\sigma_s},$$

where each of the scattering coefficient $\sigma_s(\lambda)$, absorption coefficient $\sigma_a(\lambda)$, and attenuation coefficient $\mu(\lambda)$ may be dependent on the wavelength $\lambda$. Associating constant $I_0$ with the incident light, $I_0 = I(\lambda)$, and further association the backward-propagating light, $I_R(0)$, at z=0 as the light reflected from the medium, the reflectivity $r(\lambda) = I_R(0)/I_0$ may be expressed as $$r(\lambda) = \frac{\sigma_s(\lambda)}{\mu(\lambda) + \sigma_a(\lambda) + \sigma_s(\lambda)}.$$

Reflectivity $r(\lambda)$ in the spectral representation may be determined in a substantially similar way to how the determination of the transmissivity $t(\lambda, L)$ is performed, as described above. Specifically, a model reflectivity may include one or more fitting parameters (such as reflectivity values $\bar{r}_s$ within various spectral intervals separated by boundaries $\lambda_\alpha$). The fitting parameters are then determined based on the similarity between the color appearances of the reflected light in the target color space and reflected light simulated in the spectral representation.

Figure 5:
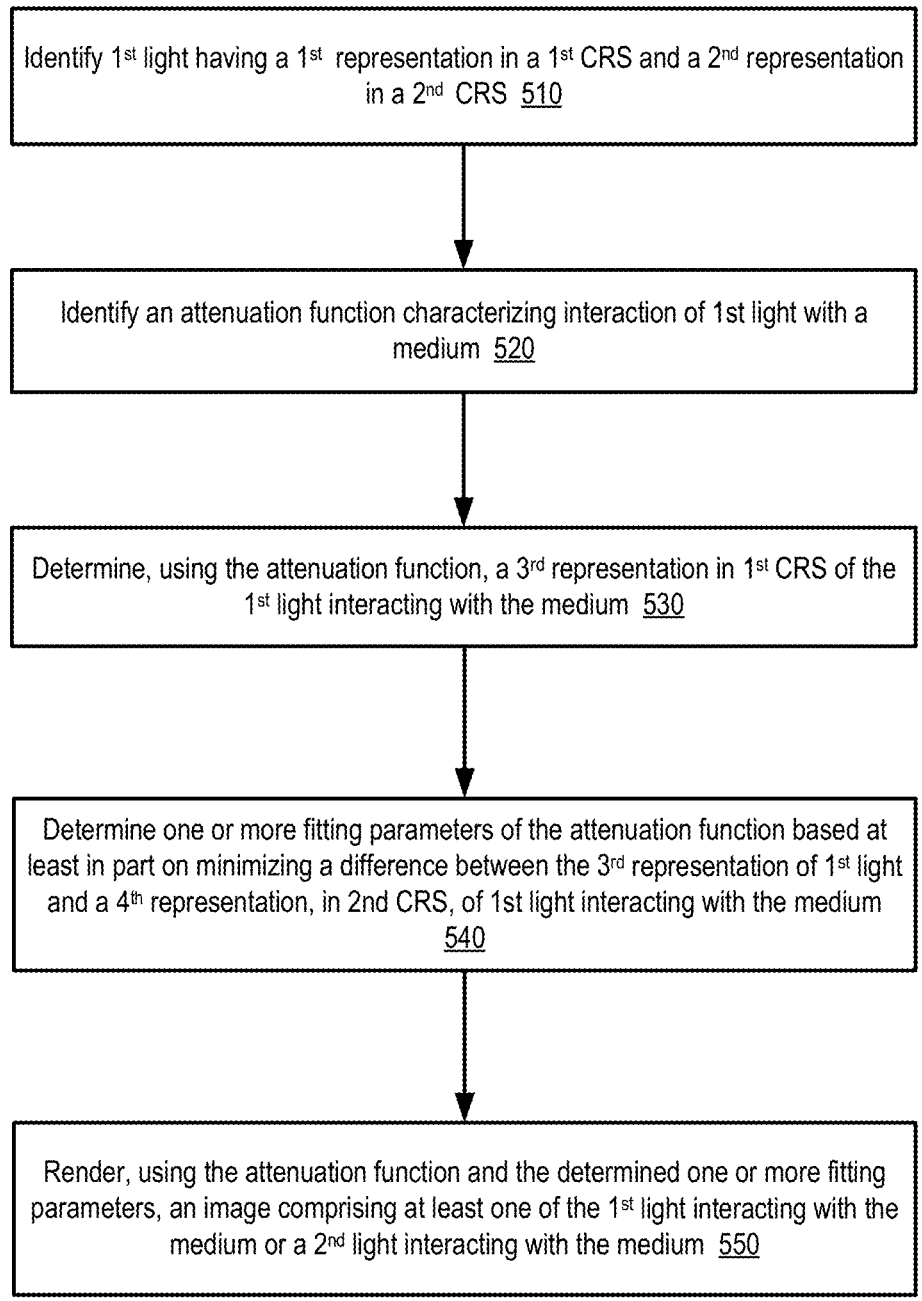
FIG. 5 is a flow diagram of an example method of efficient spectral rendering of light interacting with a volume medium, according to some embodiments of the present disclosure.

FIG. 5 is a flow diagram of an example method 500 of efficient spectral rendering of light interacting with a volume medium, according to some embodiments of the present disclosure. In some embodiments, method 500 may be performed by processing units of image processing server 101 of FIG. 1 executing instructions of one or more software modules (e.g., image rendering engine 104). Method 500 may be performed by one or more processing units (e.g., CPUs and/or GPUs), which may include (or communicate with) one or more memory devices. In some embodiments, method 500 may be performed by multiple processing threads (e.g., CPU threads and/or GPU threads), each thread executing one or more individual functions, routines, subroutines, or operations of the method. In some embodiments, processing threads implementing method 500 may be synchronized (e.g., using semaphores, critical sections, and/or other thread synchronization mechanisms). Alternatively, processing threads implementing method 500 may be executed asynchronously with respect to each other. Various operations of method 500 may be performed in a different order compared with the order shown in FIG. 5. Some operations of the methods may be performed concurrently with other operations. In some embodiments, one or more operations shown in FIG. 5 may not always be performed.

Method 500 may be performed to render, using a spectral representation, images that are based on image data available (e.g., provided by a user or image developer) in a representation that is different from the spectral representation, e.g., in any tristimulus color space. In some embodiments, image data may include an input image in a tristimulus (e.g., RGB, XYZ etc.) space and image rendering engine 104 may render a copy of the input image in a spectral representation while reproducing colors of the input image to a high degree of accuracy. In some embodiments, image rendering engine 104 may render other images using the input image as a base image. For example, other rendered images may be images with different locations of the same objects and light sources, images with different objects and/or light sources, animated images, motion picture frames (e.g., video game images), and the like. Processing units performing method 500 may identify, at block 510, a first light having a first representation in a first color rendering scheme (CRS) and a second representation in a second CRS. For example, the first light may be an incident light identified in an input image or in other input data. The first CRS may be a spectral rendering scheme, and the first representation, e.g., $I(\lambda)$, may specify the intensity of light as a function of wavelength $\lambda$. The second CRS may be a tristimulus rendering scheme in which the same first light is represented via tristimulus values $[a_1, a_2, a_3]$. In some embodiments, the second representation is provided with the input data (e.g., ascertained from input image) whereas the first representation is simulated based on the tristimulus values. In some embodiments, more than three values may be used to identify the first light in the second RCS.

At block 520, method 500 may continue with the processing units identifying an attenuation function characterizing interaction of the first light with a medium (as described in more detail in conjunction with FIG. 3A and FIG. 3B). The medium may be any volume medium that is at least partially transparent to light (e.g., first light); the medium may absorb and scatter light resulting in attenuation of the intensity of the first light as the first light interacts with the medium (e.g., via transmission or reflection or both). In some embodiments, a degree to which the first light is absorbed and/or scattered may be specified in the input data, e.g., via scattering and/or absorption coefficients for different primary colors of the second SRC. The identified attenuation function may describe transmission of light through the volume medium, e.g., $t(\lambda, L)$ or $\ln[t(\lambda, L)]$ in the instances of transmission and/or $r(\lambda)$ in the instances of reflection. Identification of the attenuation function may include specifying a general form of the attenuation function, a number and type of fitting parameters, a range of wavelengths characterized by the attenuation function, and so on. In some embodiments, the attenuation function may be an exponential function $t(\lambda, L) = e^{-\mu(\lambda)L}$ of a product of an attenuation coefficient $\mu(\lambda)$ and a depth L of the medium.

In some embodiments, the attenuation function may be a piecewise-constant function of wavelength which takes a plurality of values, $\bar{\mu}_s$, each of the plurality of values associated with a respective one of a plurality of wavelength intervals, e.g., $[\lambda_{min}, \lambda_1], [\lambda_1, \lambda_2], \ldots [\lambda_{N-1}, \lambda_{max}]$. In some embodiments, one or more fitting parameters of the attenuation function may include at least one boundary $\lambda_j$ between adjacent intervals of the plurality of wavelength intervals. In some embodiments, one or more of the plurality of values $\bar{\mu}_s$ (e.g., $\bar{\mu}_1, \bar{\mu}_2, \ldots \bar{\mu}_M$) may be based on attenuation coefficients $\mu_1, \mu_2, \ldots \mu_N$ of the medium for a respective color of the second CRS. In some instances, the attenuation coefficients $\mu_1, \mu_2, \ldots \mu_N$ of the medium may be specified in the input data or ascertained from the input image. In some embodiments, some of the values $\bar{\mu}_1, \bar{\mu}_2, \ldots \bar{\mu}_M$ may be equal (or proportional) to some of the attenuation coefficients $\mu_1, \mu_2, \ldots \mu_N$. In some embodiments, number M of values $\bar{\mu}_s$ may be different from number N of the attenuation coefficients $\mu_j$. In some embodiments, number M of values $\bar{\mu}_s$ may be the same as number N of the attenuation coefficients $\mu_j$. In some embodiments, the values $\bar{\mu}_s$ may be selected such as follows: $\bar{\mu}_1 = \mu_1, \bar{\mu}_2 = \mu_2, \ldots, \bar{\mu}_N = \mu_N$.

At block 530, method 500 may continue with the processing units determining, using the attenuation function, a third representation in the first CRS of the first light interacting with the medium. For example, the third representation may be a spectral intensity of the first light transmitted through the medium, e.g., $t(\lambda, L)I(\lambda)$ or a spectral intensity of the first light reflected from the medium, $r(\lambda)I(\lambda)$. In addition to the third representation, a fourth representation may be used that characterizes how the first light interacts with the medium in the second CRS, e.g., the fourth representation may include tristimulus values of the first light after the first light has passed through (or reflected from) the medium.

At block 540, method 500 may continue with the processing units determining (e.g., as described in more detail in conjunction with FIG. 4A and FIG. 4B) one or more fitting parameters of the attenuation function based at least in part on minimizing a difference between the third representation of the first light and a fourth representation of the first light interacting with the medium. In some embodiments, determining the one or more fitting parameters may be performed in conjunction with method 600 described in conjunction with FIG. 6.

At block 550, method 500 may continue with the processing units rendering, using the attenuation function and the determined one or more fitting parameters, an image comprising at least one of the first light interacting with the medium or a second light interacting with the medium. For example, the determined attenuation function may be used to render, in the spectral representation (first CRS) at least a part of the input image having the first light. Specifically, image rendering engine may render a copy of the input image using the spectral representation and the determined attenuation function. In some embodiments, image rendering engine may create additional image(s) using the spectral representation and the determined attenuation function. Creation of such additional image(s) may include rendering second (third, fourth, etc.) light(s) having a spectral composition (e.g., $I_2(\lambda)$, $I_3(\lambda)$, $I_4(\lambda)$, . . . ) that is different from the spectral composition $I(\lambda)$) of the first light used for obtaining the attenuation function.

Figure 6:
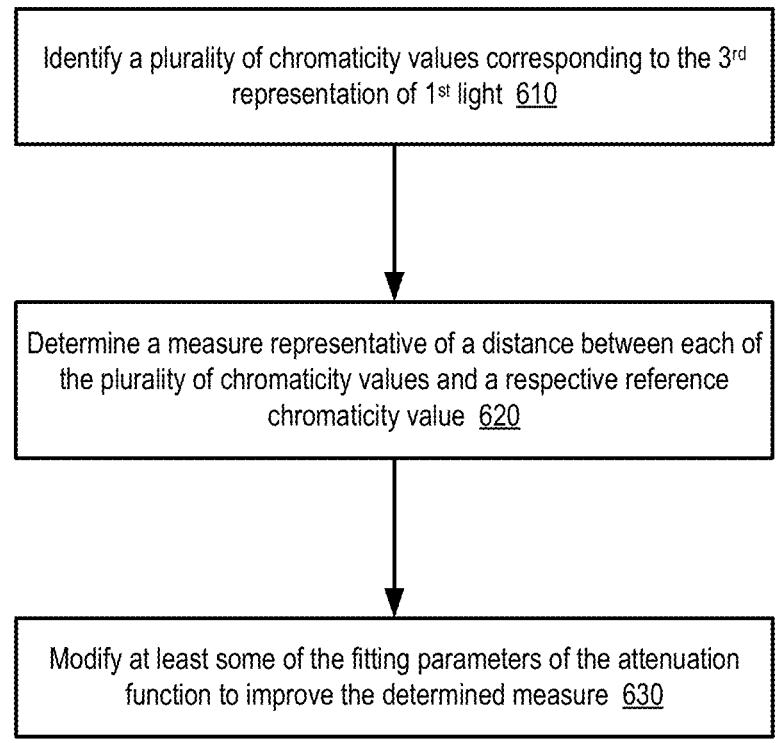
FIG. 6 is a flow diagram of an example method of optimizing an attenuation function for use with spectral rendering of light interacting with a volume medium, according to some embodiments of the present disclosure.

FIG. 6 is a flow diagram of an example method 600 of optimizing an attenuation function for use with spectral rendering of light interacting with a volume medium, according to some embodiments of the present disclosure. In some embodiments, method 600 may be performed by image rendering engine 104 as part of method 500 (e.g., in conjunction with block 540). More specifically, determining the fitting parameters may include identifying, at block 610, a plurality of chromaticity values (e.g., X and Y) corresponding to the third representation (e.g., $t(\lambda,L)I(\lambda)$ or $r(\lambda)I(\lambda)$) of the first light. In one embodiment, the plurality of reference chromaticity values may be associated with a plurality of primary colors of the second CRS (e.g., XYZ color space or RGB color space). As indicated by block 620 of method 600, determining the fitting parameters may further include determining a measure (e.g., an error measure $f$ representative of a distance between each of the plurality of chromaticity values and a respective one of a plurality of reference chromaticity values (e.g., $(x_j, y_j)$, as described in more detail in conjunction with FIG. 4A, FIG. 4B, and FIG. 4C). As indicated by block 620 of method 600, determining the fitting parameters may further include modifying at least some of the fitting parameters to improve (e.g., minimize) the determined measure. In some embodiments, modification of the fitting parameters may be performed using multiple iterations.

Inference and Training Logic

Figure 7A:
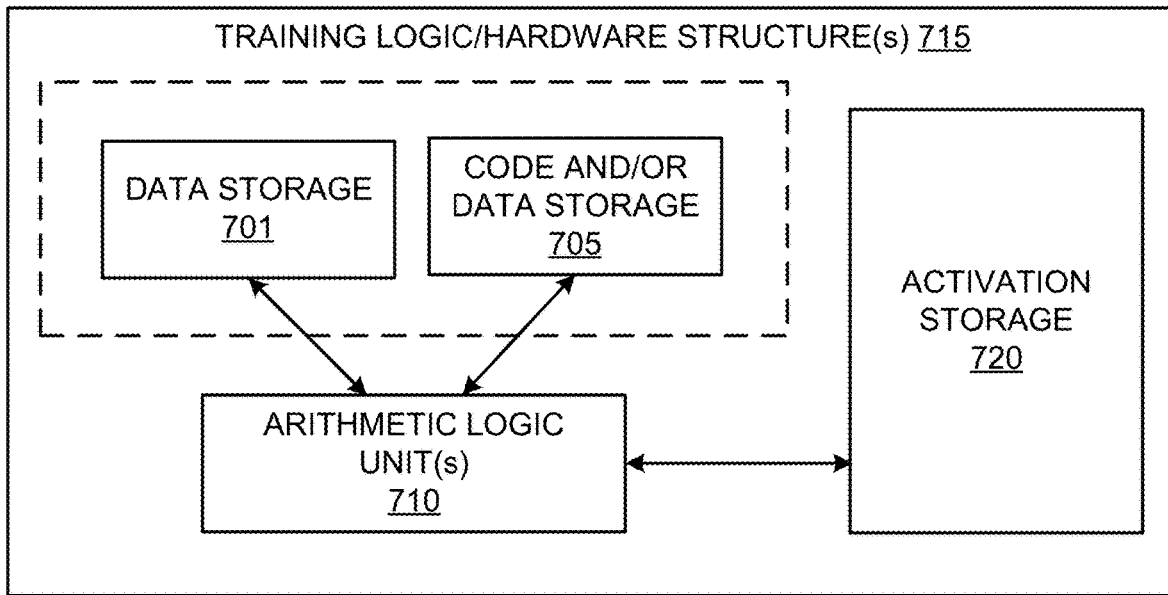
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
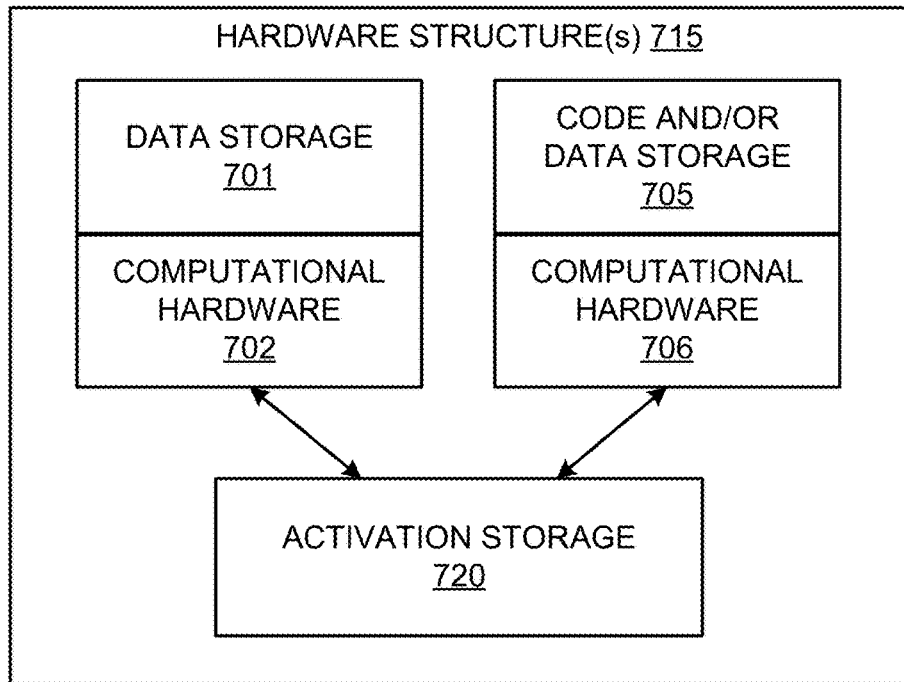
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 105 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
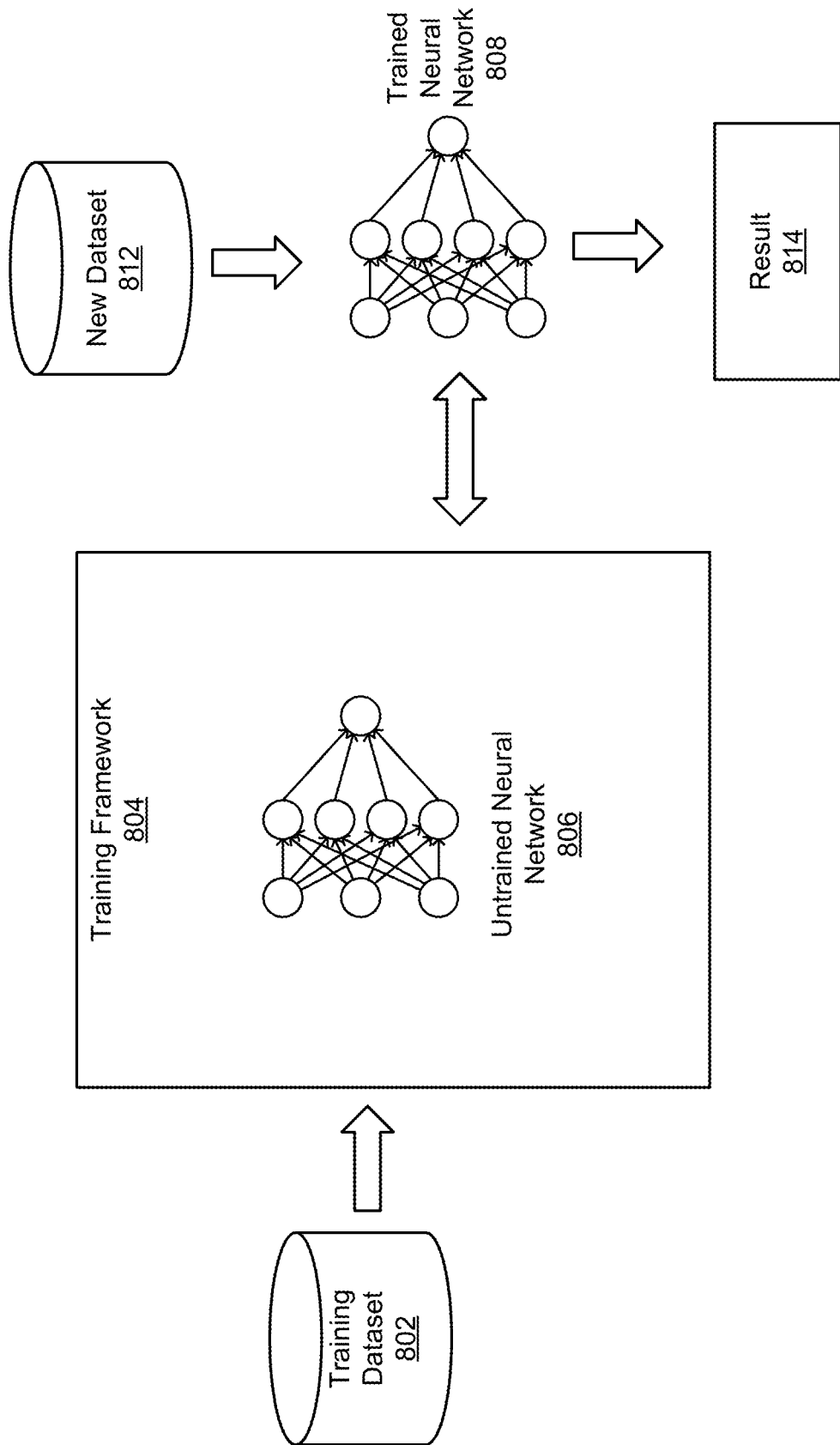
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 may then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 may learn groupings within training dataset 802 and may determine how individual inputs are related to untrained dataset 802. In at least one embodiment, unsupervised training may be used to generate a self-organizing map in trained neural network 808 capable of performing operations useful in reducing dimensionality of new dataset 812. In at least one embodiment, unsupervised training may also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
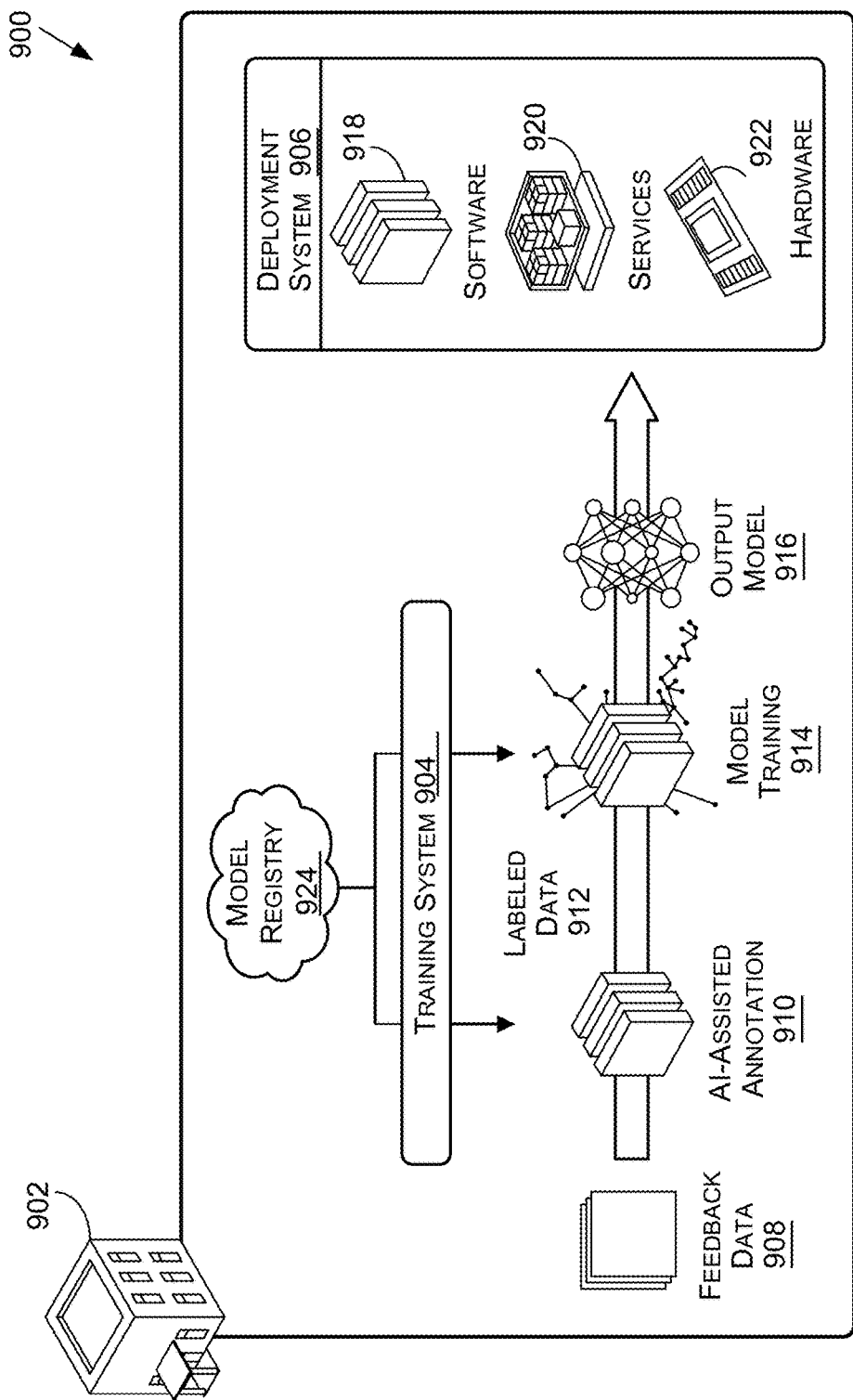
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some of applications used in advanced processing and inferencing pipelines may use machine learning models or other AI to perform one or more processing steps. In at least one embodiment, machine learning models may be trained at facility 902 using feedback data 908 (such as feedback data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
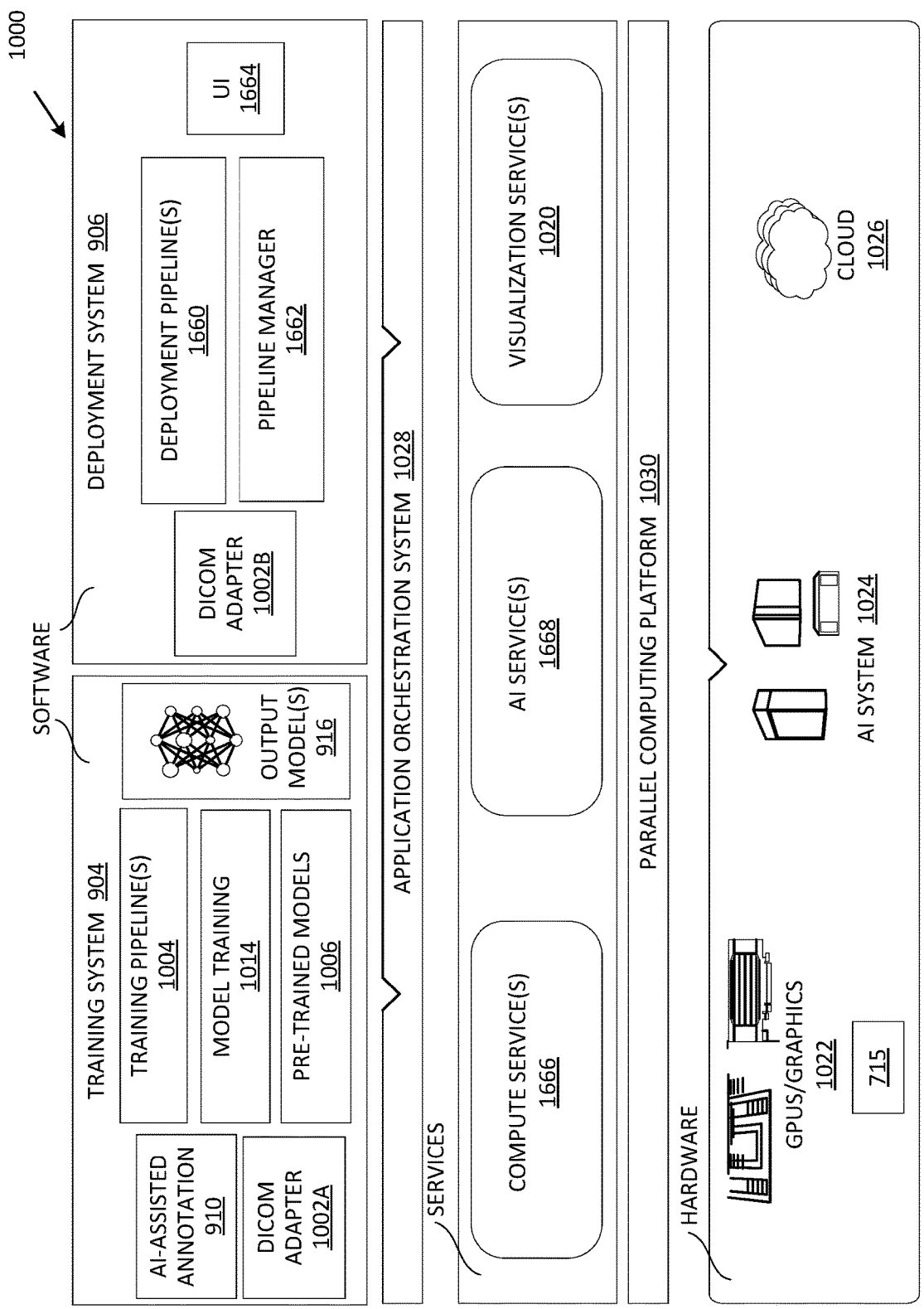
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity—who provides an inference or image processing request—may browse a container registry and/or model registry 924 for an application, container, dataset, machine learning model, etc., select a desired combination of elements for inclusion in data processing pipeline, and submit an processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel (e.g., using a parallel computing platform 1030 (FIG. 10)). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon a same inference service to perform one or more inferencing tasks.

In at least one embodiment, hardware 922 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, as non-limiting examples. In at least one embodiment, at least some of computing environment of deployment system 906 and/or training system 904 may be executed in a datacenter one or more supercomputers or high performance computing systems, with GPU optimized software (e.g., hardware and software combination of NVIDIA's DGX system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 3006) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public IPs that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines data 1660 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004 similar to a first example described with respect to FIG. 9 may be used for a first machine learning model, training pipeline 1004 similar to a second example described with respect to FIG. 9 may be used for a second machine learning model, and training pipeline 1004 similar to a third example described with respect to FIG. 9 may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment or embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines data 1660; either in addition to, or in lieu of AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s) (e.g., facility 902). In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines data 1660. In at least one embodiment, deployment pipelines data 1660 may include any number of applications that may be sequentially, non-sequentially, or otherwise applied to feedback data (and/or other data types)—including AI-assisted annotation, as described above. In at least one embodiment, as described herein, a deployment pipeline data 1660 for an individual device may be referred to as a virtual instrument for a device. In at least one embodiment, for a single device, there may be more than one deployment pipeline data 1660 depending on information desired from data generated by a device.

In at least one embodiment, applications available for deployment pipelines data 1660 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface data 1664 (e.g., a graphical user interface, a web interface, etc.) that may be used to select applications for inclusion in deployment pipeline(s) data 1660, arrange applications, modify or change applications or parameters or constructs thereof, use and interact with deployment pipeline(s) data 1660 during set-up and/or deployment, and/or to otherwise interact with deployment system 906. In at least one embodiment, although not illustrated with respect to training system 904, user interface data 1664 (or a different user interface) may be used for selecting models for use in deployment system 906, for selecting models for training, or retraining, in training system 904, and/or for otherwise interacting with training system 904.

In at least one embodiment, pipeline manager data 1662 may be used, in addition to an application orchestration system 1028, to manage interaction between applications or containers of deployment pipeline(s) data 1660 and services 920 and/or hardware 922. In at least one embodiment, pipeline manager data 1662 may be configured to facilitate interactions from application to application, from application to service 920, and/or from application or service to hardware 922. In at least one embodiment, although illustrated as included in software 918, this is not intended to be limiting, and in some examples pipeline manager data 1662 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) data 1660 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager data 1662 and application orchestration system 1028. In at least one embodiment, so long as an expected input and/or output of each container or application is known by a system (e.g., based on constructs of applications or containers), application orchestration system 1028 and/or pipeline manager data 1662 may facilitate communication among and between, and sharing of resources among and between, each of applications or containers. In at least one embodiment, because one or more of applications or containers in deployment pipeline(s) data 1660 may share same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged by and shared by applications or containers in deployment system 906 may include compute services data 1666, AI services data 1668, visualization services 1020, and/or other service types. In at least one embodiment, applications may call (e.g., execute) one or more of services 920 to perform processing operations for an application. In at least one embodiment, compute services data 1666 may be leveraged by applications to perform super-computing or other high-performance computing (HPC) tasks. In at least one embodiment, compute service(s) data 1666 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services data 1668 may be leveraged to perform inferencing services for executing machine learning model(s) associated with applications (e.g., tasked with performing one or more processing tasks of an application). In at least one embodiment, AI services data 1668 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) data 1660 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services data 1668.

In at least one embodiment, shared storage may be mounted to AI services data 1668 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, a scheduler (e.g., of pipeline manager data 1662) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) data 1660. In at least one embodiment, GPUs 1022 may be leveraged by visualization services 1020 to generate visualizations. In at least one embodiment, rendering effects, such as ray-tracing, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA and/or QUADRO GPUs) may include any number of GPUs that may be used for executing processing tasks of compute services data 1666, AI services data 1668, visualization services 1020, other services, and/or any of features or functionality of software 918. For example, with respect to AI services data 1668, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may tasked with executing at least some of services 920 of system 1000, including compute services data 1666, AI services data 1668, and/or visualization services 1020, as described herein. In at least one embodiment, cloud 1026 may perform small and large batch inference (e.g., executing NVIDIA's TENSOR RT), provide an accelerated parallel computing API and platform 1030 (e.g., NVIDIA's CUDA), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry—such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

At least one embodiment of the disclosure may be described in view of the following clauses:

In clause 1, a method image rendering, comprising identifying a first light in a scene, the first light having a first representation in a first color rendering scheme (CRS) and a second representation in a second CRS, identifying an attenuation function characterizing interaction of the first light with a medium in the scene, determining, using the attenuation function, a third representation in the first CRS of the first light interacting with the medium, determining one or more fitting parameters of the attenuation function based at least in part on minimizing a difference between the third representation of the first light and a fourth representation, in the second CRS, of the first light interacting with the medium, and rendering, using the attenuation function and the determined one or more fitting parameters, an image comprising at least one of the first light interacting with the medium or a second light interacting with the medium.

In clause 2, the method of clause 1, wherein the first CRS is a spectral rendering scheme.

In clause 3, the method of clause 1, wherein the second CRS is a tristimulus rendering scheme.

In clause 4, the method of clause 1, wherein the attenuation function is an exponential function of a product of an attenuation coefficient and a depth of the medium.

In clause 5, the method of clause 1, wherein the attenuation function is a piecewise-constant function of a wavelength comprising a plurality of values, each of the plurality of values associated with a respective one of a plurality of wavelength intervals.

In clause 6, the method of clause 5, wherein one or more of the plurality of values are based on attenuation coefficients of the medium for a respective color of the second CRS.

In clause 7, the method of clause 5, wherein the one or more fitting parameters comprise at least one boundary between adjacent intervals of the plurality of wavelength intervals.

In clause 8, the method of clause 1, wherein determining the one or more fitting parameters of the attenuation function comprises: identifying a plurality of chromaticity values corresponding to the third representation of the first light, and determining a measure representative of a distance between each of the plurality of chromaticity values and a respective one of a plurality of reference chromaticity values.

In clause 9, the method of clause 8, wherein the plurality of reference chromaticity values are associated with a plurality of primary colors of the second CRS.

In clause 10, the method of clause claim 1, wherein the second light has a spectral composition that is different from a spectral composition of the first light.

In clause 11, the method of clause 1, wherein the first light has a spectral composition of a natural outdoor light source.

In clause 12, a system comprising: a memory device and one or more processing devices, communicatively coupled to the memory device, to: identify a first light in a scene, the first light having a first representation in a first color rendering scheme (CRS) and a second representation in a second CRS, identify an attenuation function characterizing interaction of the first light with a medium in the scene, determine, using the attenuation function, a third representation in the first CRS of the first light interacting with the medium, determine one or more fitting parameters of the attenuation function based at least in part on minimizing a difference between the third representation of the first light and a fourth representation, in the second CRS, of the first light interacting with the medium, and render, using the attenuation function and the determined one or more fitting parameters, an image comprising at least one of the first light interacting with the medium or a second light interacting with the medium.

In clause 13, the system of clause 12, wherein the first CRS is a spectral rendering scheme and the second CRS is a tristimulus rendering scheme.

In clause 14, the system of clause 12, wherein the attenuation function is an exponential function of a product of an attenuation coefficient and a depth of the medium.

In clause 15, the system of clause 12, wherein the attenuation function is a piecewise-constant function of a wavelength comprising a plurality of values, each of the plurality of values associated with a respective one of a plurality of wavelength intervals, and wherein one or more of the plurality of values are based on attenuation coefficients of the medium for a respective color of the second CRS.

In clause 16, the system of clause 15, wherein the one or more fitting parameters comprise at least one boundary between adjacent intervals of the plurality of wavelength intervals.

In clause 17, the system of clause 12, wherein to determine the one or more fitting parameters of the attenuation function, the one or more processing devices are further to: identify a plurality of chromaticity values corresponding to the third representation of the first light, and determine a measure representative of a distance between each of the plurality of chromaticity values and a respective one of a plurality of reference chromaticity values.

In clause 18, the system of clause 17, wherein the plurality of reference chromaticity values are associated with a plurality of primary colors of the second CRS.

In clause 19, the system of clause 12, wherein the second light has a spectral composition that is different from a spectral composition of the first light.

In clause 20, a non-transitory computer-readable medium storing instructions thereon, wherein the instructions, when executed by a processing device, cause the processing device to: identify a first light in a scene, the first light having a first representation in a first color rendering scheme (CRS) and a second representation in a second CRS, identify an attenuation function characterizing interaction of the first light with a medium in the scene, determine, using the attenuation function, a third representation in the first CRS of the first light interacting with the medium, determine one or more fitting parameters of the attenuation function based at least in part on minimizing a difference between the third representation of the first light and a fourth representation, in the second CRS, of the first light interacting with the medium, and render, using the attenuation function and the determined one or more fitting parameters, an image comprising at least one of the first light interacting with the medium or a second light interacting with the medium.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method of image rendering, the method comprising:
    identifying a first light in a scene, the first light having a first representation in a first color rendering scheme (CRS) and a second representation in a second CRS;
    identifying an attenuation function characterizing interaction of the first light with a medium in the scene;
    determining, using the attenuation function, a third representation in the first CRS of the first light interacting with the medium;
    determining one or more fitting parameters of the attenuation function based at least in part on minimizing a difference between the third representation of the first light and a fourth representation, in the second CRS, of the first light interacting with the medium; and
    rendering, using the attenuation function and the determined one or more fitting parameters, an image comprising at least one of the first light interacting with the medium or a second light interacting with the medium.

2. The method of claim 1, wherein the first CRS is a spectral rendering scheme.

3. The method of claim 1, wherein the second CRS is a tristimulus rendering scheme.

4. The method of claim 1, wherein the attenuation function is an exponential function of a product of an attenuation coefficient and a depth of the medium.

5. The method of claim 1, wherein the attenuation function is a piecewise-constant function of a wavelength comprising a plurality of values, each of the plurality of values associated with a respective one of a plurality of wavelength intervals.

6. The method of claim 5, wherein one or more of the plurality of values are based on attenuation coefficients of the medium for a respective color of the second CRS.

7. The method of claim 5, wherein the one or more fitting parameters comprise at least one boundary between adjacent intervals of the plurality of wavelength intervals.

8. The method of claim 1, wherein determining the one or more fitting parameters of the attenuation function comprises:
    identifying a plurality of chromaticity values corresponding to the third representation of the first light; and
    determining a measure representative of a distance between each of the plurality of chromaticity values and a respective one of a plurality of reference chromaticity values.

9. The method of claim 8, wherein the plurality of reference chromaticity values are associated with a plurality of primary colors of the second CRS.

10. The method of claim 1, wherein the second light has a spectral composition that is different from a spectral composition of the first light.

11. The method of claim 1, wherein the first light has a spectral composition of a natural outdoor light source.

12. A system comprising:
    a memory device; and
    one or more processing devices, communicatively coupled to the memory device, to:
        identify a first light in a scene, the first light having a first representation in a first color rendering scheme (CRS) and a second representation in a second CRS;
        identify an attenuation function characterizing interaction of the first light with a medium in the scene;
        determine, using the attenuation function, a third representation in the first CRS of the first light interacting with the medium;
        determine one or more fitting parameters of the attenuation function based at least in part on minimizing a difference between the third representation of the first light and a fourth representation, in the second CRS, of the first light interacting with the medium; and
        render, using the attenuation function and the determined one or more fitting parameters, an image comprising at least one of the first light interacting with the medium or a second light interacting with the medium.

13. The system of claim 12, wherein the first CRS is a spectral rendering scheme and the second CRS is a tristimulus rendering scheme.

14. The system of claim 12, wherein the attenuation function is an exponential function of a product of an attenuation coefficient and a depth of the medium.

15. The system of claim 12, wherein the attenuation function is a piecewise-constant function of a wavelength comprising a plurality of values, each of the plurality of values associated with a respective one of a plurality of wavelength intervals, and wherein one or more of the plurality of values are based on attenuation coefficients of the medium for a respective color of the second CRS.

16. The system of claim 15, wherein the one or more fitting parameters comprise at least one boundary between adjacent intervals of the plurality of wavelength intervals.

17. The system of claim 12, wherein to determine the one or more fitting parameters of the attenuation function, the one or more processing devices are further to:
    identify a plurality of chromaticity values corresponding to the third representation of the first light; and
    determine a measure representative of a distance between each of the plurality of chromaticity values and a respective one of a plurality of reference chromaticity values.

18. The system of claim 17, wherein the plurality of reference chromaticity values are associated with a plurality of primary colors of the second CRS.

19. The system of claim 12, wherein the second light has a spectral composition that is different from a spectral composition of the first light.

20. A non-transitory computer-readable medium storing instructions thereon, wherein the instructions, when executed by a processing device, cause the processing device to:
    identify a first light in a scene, the first light having a first representation in a first color rendering scheme (CRS) and a second representation in a second CRS;
    identify an attenuation function characterizing interaction of the first light with a medium in the scene;
    determine, using the attenuation function, a third representation in the first CRS of the first light interacting with the medium;
    determine one or more fitting parameters of the attenuation function based at least in part on minimizing a difference between the third representation of the first light and a fourth representation, in the second CRS, of the first light interacting with the medium; and
    render, using the attenuation function and the determined one or more fitting parameters, an image comprising at least one of the first light interacting with the medium or a second light interacting with the medium.

* * * * *